United States Patent
Rains, Jr. et al.

(10) Patent No.: US 9,727,037 B2
(45) Date of Patent: Aug. 8, 2017

(54) ENVIRONMENTAL CONTROL USING A CHAOTIC FUNCTION

(75) Inventors: Jack C. Rains, Jr., Herndon, VA (US); David P. Ramer, Reston, VA (US)

(73) Assignee: ABL IP HOLDING LLC, Conyers, GA (US)

( * ) Notice: Subject to any disclaimer, the term of this patent is extended or adjusted under 35 U.S.C. 154(b) by 503 days.

(21) Appl. No.: 13/594,236

(22) Filed: Aug. 24, 2012

(65) Prior Publication Data
US 2014/0058566 A1    Feb. 27, 2014

(51) Int. Cl.
G05B 19/18    (2006.01)
G05B 15/02    (2006.01)

(52) U.S. Cl.
CPC ...... G05B 15/02 (2013.01); *G05B 2219/2642* (2013.01)

(58) Field of Classification Search
CPC .................... G05B 15/02; G05B 2219/2642
USPC .................................................. 700/275–278
See application file for complete search history.

(56) References Cited

U.S. PATENT DOCUMENTS

| | | | | |
|---|---|---|---|---|
| 5,404,298 A * | 4/1995 | Wang | ...................... | G05B 5/01 700/32 |
| 5,926,385 A * | 7/1999 | Lee | .......................... | G05B 5/01 700/33 |
| 6,049,614 A * | 4/2000 | Kim | ...................... | H04L 27/001 375/354 |
| 6,377,858 B1 * | 4/2002 | Koeppe | .................. | G05B 15/02 700/12 |
| 6,483,484 B1 * | 11/2002 | Yamazaki | ................ | A61B 5/16 345/8 |
| 6,542,077 B2 | 4/2003 | Joao | | |

(Continued)

FOREIGN PATENT DOCUMENTS

| CN | 101315544 | * | 12/2008 | |
|---|---|---|---|---|
| CN | 101957602 | * | 1/2011 | ............. G05B 13/02 |
| WO | WO2010079388 | * | 7/2010 | ............. H05B 37/02 |
| WO | WO 2010079388 A1 * | | 7/2010 | ............. H05B 37/02 |

OTHER PUBLICATIONS

English translation of chinese Patent CN101315544—Greenhouse intelligent control method.*

(Continued)

*Primary Examiner* — Kenneth M Lo
*Assistant Examiner* — Alan Chu
(74) *Attorney, Agent, or Firm* — RatnerPrestia

(57) ABSTRACT

One or more controlled environmental conditions have a characteristic thereof that varies over time at least in part in accordance with a chaotic function. Variable control, for example, may control one or more characteristics of visible lighting of the environmentally controlled space. Examples of lighting characteristics that may be controlled in such a manner include spectral content, intensity, color temperature, chromaticity difference or Delta_uv, and polarization. In addition or instead, one or more characteristics of the atmosphere in the controlled environment may be controlled based on a chaotic function. Examples of atmospheric characteristics that may be controlled in such a manner include temperature, humidity, air pressure, ionization, electromagnetic fields, precipitation, visibility, wind, smell and chemical composition. A sound system may also provide a chaotic component to the environment in the environmentally controlled space.

38 Claims, 13 Drawing Sheets

(56) References Cited

U.S. PATENT DOCUMENTS

| | | | |
|---|---|---|---|
| 6,986,056 B1 | 1/2006 | Dultz | |
| 7,924,206 B2 | 4/2011 | Sano | |
| 7,990,252 B2 | 8/2011 | Barton | |
| 8,141,373 B2 * | 3/2012 | Peterson et al. | 62/158 |
| 8,160,729 B2 * | 4/2012 | Ahmed | 700/47 |
| 8,373,107 B2 | 2/2013 | Meyers | |
| 8,519,566 B2 | 8/2013 | Recker et al. | |
| 8,715,327 B1 | 5/2014 | Lovett et al. | |
| 8,779,669 B2 | 7/2014 | Ramer et al. | |
| 9,410,903 B2 | 8/2016 | Duncan | |
| 2002/0176455 A1 * | 11/2002 | Triandaf | G05B 5/01 372/21 |
| 2003/0151501 A1 | 8/2003 | Teckchandani et al. | |
| 2004/0212309 A1 | 10/2004 | St. Germain | |
| 2005/0007779 A1 | 1/2005 | Nozawa et al. | |
| 2007/0141163 A1 | 6/2007 | Vitaliano et al. | |
| 2007/0247414 A1 | 10/2007 | Roberts | |
| 2009/0045748 A1 | 2/2009 | You | |
| 2009/0276062 A1 * | 11/2009 | Kanai | A61B 5/16 700/45 |
| 2010/0141153 A1 | 6/2010 | Recker et al. | |
| 2010/0327766 A1 | 12/2010 | Recker et al. | |
| 2011/0031806 A1 * | 2/2011 | Altonen | E06B 9/68 307/32 |
| 2011/0062888 A1 | 3/2011 | Bondy et al. | |
| 2011/0133649 A1 | 6/2011 | Kreiner et al. | |
| 2011/0133655 A1 | 6/2011 | Recker et al. | |
| 2012/0007515 A1 | 1/2012 | Krummel | |
| 2012/0169490 A1 | 7/2012 | Yu et al. | |
| 2012/0206050 A1 | 8/2012 | Spero | |
| 2013/0093599 A1 | 4/2013 | Duncan et al. | |

OTHER PUBLICATIONS

RunJie, Liu, CN101957602 English Translation—Method and system thereof for monitoring and controlling environments of public place based on Zigbee.*

Notice of Allowance dated May 21, 2014, issued in U.S. Appl. No. 13/594,206, filed Aug. 24, 2012, entitled "Chaotic Approach to Control of Lighting."
Entire patent prosecution history of U.S. Appl. No. 14/303,643, filed Jun. 13, 2014, entitled "Chaotic Approach to Control of Lighting."
"Circadian rhythm," Wikipedia, <http://en.wikipedia.org/wiki/Circadian_rhythm>, Retrieved on May 9, 2012.
"Chaos theory", WhatIs.com, <http://whatis.techtarget.com/definition/chaos-theory?vgnextfmt=print>, Retrieved Jul. 17, 2012.
"Chaos theory," Wikipedia, <http://en.wikipedia.org/wiki/Chaos_theory>, Retrieved on Jul. 17, 2012.
Non-final Office Action issued in U.S. Appl. No. 13/594,206 dated Apr. 10, 2014.
Non-final Office Action dated Apr. 14, 2015, issued in U.S. Appl. No. 14/618,690, filed Feb. 10, 2015, entitled "Chaotic Approach to Control of Lighting."
Entire patent prosecution history of U.S. Appl. No. 13/594,206, filed Aug. 24, 2012, entitled "Chaotic Approach to Control of Lighting."
Notice of Allowance issued in U.S. Appl. No. 14/303,643, dated Nov. 24, 2014.
Non-final Office Action dated Oct. 22, 2015, issued in U.S. Appl. No. 14/618,690 entitled "Chaotic Approach to Control of Lighting," filed Feb. 10, 2015.
Non-final Office Action dated Feb. 26, 2016, issued in U.S. Appl. No. 14/618,690, filed Feb. 10, 2015, entitled "Chaotic Approach to Control of Lighting."
Final Office Action dated Dec. 24, 2015, issued in U.S. Appl. No. 14/618,690, filed Feb. 10, 2015, entitled "Chaotic Approach to Control of Lighting."
Non-final Office Action dated May 31, 2016, issued in U.S. Appl. No. 14/618,690, filed Feb. 10, 2015, entitled "Chaotic Approach to Control of Lighting."
Notice of Allowance for U.S. Appl. No. 14/476,341, mailed Mar. 6, 2017, 11 pages.
Notice of Allowance for U.S. Appl. No. 14/618,690, mailed Dec. 27, 2016, 17 pages.
Notice of Allowance for U.S. Appl. No. 14/476,341, mailed Jan. 4, 2017, 13 pages.

* cited by examiner r=1.5

Chaotic Equation sine Equation sine Equation * (1-Chaotic Equation*D)

Where D equals dampening function constant

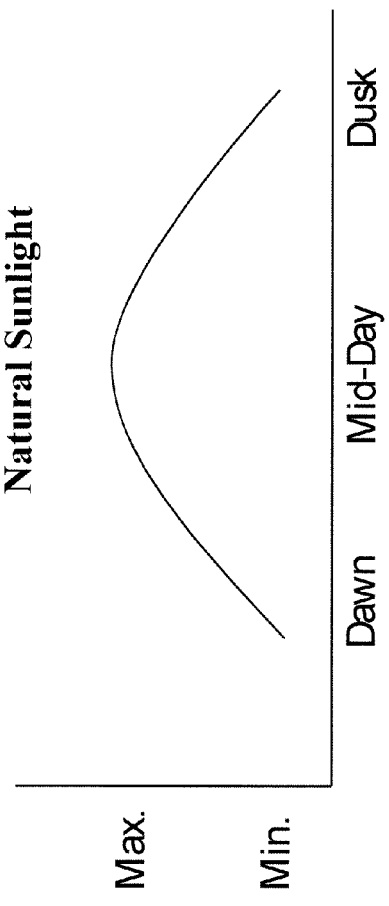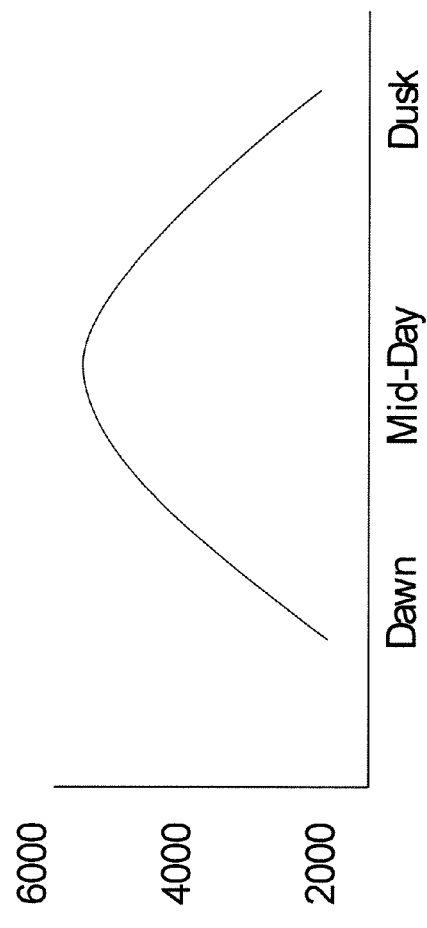

High-frequency Chaotic Equation

Low-frequency Chaotic Equation

Combined with damping

ENVIRONMENTAL CONTROL USING A CHAOTIC FUNCTION

RELATED APPLICATION

This application is related to U.S. Utility patent application Ser. No. 13/594,206, filed Aug. 24, 2012, now U.S. Pat. No. 8,779,669, entitled "CHAOTIC APPROACH TO CONTROL OF LIGHTING," the disclosure of which is entirely incorporated herein by reference.

TECHNICAL FIELD

The present subject matter relates to techniques and equipment to control one or more aspects of a habitable environment using a chaotic function.

BACKGROUND

Modern environmental control systems for homes, offices, retail space, manufacturing facilities, etc. offer a verity of control options. A typical heating, air conditioning and ventilation (HVAC) system, for example, enables a user to input a desired set-point temperature and will then maintain the temperature within the controlled environment at temperatures within a range of variation from the desired set-point temperature. For example, if the set-point temperature is 72° F. in a cooling mode, the HVAC will initiate air conditioning if the detected temperature exceeds the set-point by some number of degrees, e.g. by 1° F. or 2° F., and will cut-off air conditioning when the detected temperature returns to 72° F. As another example, in the heating mode, if the set-point temperature is 67° F., the HVAC will initiate heating if the detected temperature falls below the set-point by some number of degrees, e.g. by 1° F. or 2° F., and will cut-off heating when the detected temperature returns to 67° F. Similar control may be provided for other conditioners of atmospheric condition(s) for environmental control in a particular space of space. For example, humidifiers or dehumidifiers may operate in a similar manner to maintain humidity within some defined range of a set-point for relative humidity.

More modern digital controls of such environmental control systems have allowed increased variation. Returning to the HVAC example, more modern controls may allow different set-points and possibly different variation ranges at different times of day and/or different days of the week, based on different expectations for occupancy or usage of the space or space having the controlled environment. For example, many modern digital thermostats allow the user to program the thermostat to control the HVAC system to apply different set-point temperatures at different times of the day and night during weekdays as well as for different times of the day on weekends. Thermostats for commercial space may vary the set-point for times of operation within the space and/or for different times of the year based on outside environmental conditions (expected, predicted or detected), e.g. to reduce energy costs and/or to improve comfort for personnel, customers or the like within the environmentally controlled space.

Control algorithms like those outlined above are typically intended to promote an objective purpose of the space or space within which the system controls the environment, e.g. to make the atmospheric condition(s) comfortable for the occupants of the space when engaged in the expected activities that the occupants might do when within the space. In addition to atmospheric environmental conditions such as those discussed above, lighting within the space also effects the perceptions of the occupants and the effectiveness of the space for its intended purpose(s).

Electrical lighting has become commonplace in modern society. Electrical lighting devices are commonly deployed, for example, in homes and buildings of commercial and other enterprise establishments. Traditional general lighting devices have tended to be relatively dumb, in that they can be turned ON and OFF, and in some cases may be dimmed, usually in response to user activation of a relatively simple input device. Such lighting devices have also been controlled in response to ambient light detectors that turn on a light only when ambient light is at or below a threshold (e.g. as the sun goes down) and in response to occupancy sensors (e.g. to turn on light when a room is occupied and to turn the light off when the room is no longer occupied for some period). Often such devices are controlled individually or as relatively small groups at separate locations.

With the advent of modern electronics has come advancement both in the types of light sources and in the control capabilities of the lighting devices. For example, solid state sources are now becoming a commercially viable alternative to traditional light sources such as incandescent and fluorescent lamps. By nature, solid state light sources such as light emitting diodes (LEDs) and organic LEDs (OLEDs) are easily controlled by electronic logic circuits or processors. For example, many fixtures or systems using solid state light sources enable control of both intensity and color characteristics of the overall light output. Electronic controls have also been developed for other types of light sources.

Traditional control algorithms involved setting a condition or parameter of the light output, such as intensity and/or color and then maintaining the set condition within some minimal variance for a relatively long period of time, e.g. over a work day or a period occupancy. Advanced electronics in the control elements, however, have facilitated more sophisticated control algorithms. For example, some systems have been configured to vary a condition of lighting in accordance with a circadian rhythm. A circadian rhythm is a biological function that corresponds to a natural 24 hour cycle. For lighting purposes, lighting in an office or the like has been controlled in a manner to simulate variations of natural daylight over some portion of the daytime during which the office is expected to be occupied, so as to simulate that portion of the natural 24 hour cycle of sunlight.

The various programmed control algorithms for characteristics of atmospheric condition as well as lighting control algorithms based in whole or in part on a circadian rhythm may help to promote harmony of the occupants with the lighted environment. However, such algorithms are still somewhat limited. Many controls vary characteristics around set-points and at most change to different set-points at different times of the day/week/year; whereas circadian rhythm type control algorithms tend to follow a general trend, such as average intensity of daylight, over the relevant period of the day.

Also, a system for control of the characteristic(s) of one condition may not have control over the characteristic(s) of another condition. For example, an HVAC system may control temperature around a set-point, and vary the set-point based on time of day and/or day of the week, whereas the lighting system for the same space may only provide ON/OFF and dimming based on occupancy sensing and/or user input.

Biospheres have been created that integrate controls for multiple biotic and abiotic components of the enclosed environment. However, the purpose of a biosphere is to emulate nature, for scientific study or the like, not to manipulate the environment to influence an occupant's sense of being. Also, biospheres are tightly closed and controlled systems, for example, in which occupants must remains for days, months or longer. Biospheres are expensive to construct and maintain. Also, they are not open environments to and from which occupants come and go in a free and independent manner, such as homes, offices, commercial buildings or the like.

The Fraunhofer Institute developed a Virtual Sky® in the form of a ceiling grid that was illuminated to appear as a moving sky with variable light intensity and sky colors. Again, this was an emulation of a natural environmental condition not specifically configured to manipulate the environment to influence an occupant's sense of being. Also, such a lighting grid has not been integrated with other biotic or abiotic components in the controlled environment within the occupied space. Furthermore, the Virtual Sky® type grid is far too complex and expensive for wide adoption in environments for typical spaces intended for human occupancy, such as homes, offices, agricultural buildings, commercial buildings or the like, Other types of lighting have been controlled in response to various conditions or inputs, for example, in response to music. At least some musical sound may be considered chaotic. However, lighting in response to or coordinated with music has been intended for special effects lighting or entertainment and not for control of general lighting such as task lighting in an enterprise or residential space.

Hence, there is room for still further improvement in an environmental control algorithm to better promote an objective purpose of an area or space when occupied, which also may be implemented using equipment that is readily adaptable to typical environmentally controlled spaces, such as homes, offices, agricultural buildings, commercial buildings or the like.

SUMMARY

The concepts disclosed herein improve environmental control by introducing variation of one or more characteristics of at least one controlled condition in a chaotic manner.

The examples described below encompass methods that involve controlling one or more characteristics of condition(s) of the environment so as to vary over a period of time at least in part in accordance with a chaotic function. A disclosed example of a method of environmental control involves automatically varying at least one characteristic of a first environmental condition in a space to be utilized by one or more biological occupants over a period of time at least in part in accordance with a chaotic function. At least one characteristic of a second environmental condition in the space, different from the first environmental condition, also is varied over a period of time at least in part in accordance with a chaotic function.

Examples of the controlled conditions include visible illumination in the space and atmospheric condition within the environmentally controlled space. The characteristic of light controlled to vary at least in part based on a chaotic function may be one or more of: intensity of light, spectral content of light, polarization of light, color temperature of light, and chromaticity difference (Delta_uv) of light from the Planckian locus. The characteristic of atmospheric condition controlled to vary at least in part based on a chaotic function may be one or more of: temperature, humidity, pressure, ionization, air movement, visibility and chemical composition. The disclosed examples also encompass manipulation of sound as one of the chaotically controlled environmental conditions in the environmentally controlled space.

The chaotic function control may also take into account any relevant ambient condition, such as ambient light entering the environmentally controlled space and/or sonic noise in the space. Hence, examples are described below that also involve sensing a characteristic of light or other relevant condition/characteristic in the space. In such an example, the relevant variation is at least partially responsive to the sensed characteristic in the space.

The examples described in more detail below also include individual environmental control devices or systems, configured to implement chaotic function control of the type discussed herein. The concepts may be implemented in new equipment. Alternatively, the chaotic function control may be retrofitted into an existing device or system, for example, by updating the control program for the relevant controller(s), in which case relevant control functions may be embodied in programming.

Many natural environmental conditions, including weather and natural lighting, are chaotic systems. Sound may also be chaotic. The human nervous system is a chaotic system, which is at least somewhat attuned to chaotic inputs from the natural environment. Adding a chaotic variation to components of environmental conditions in an inhabited space or region, as in the examples discussed in the detailed description, may help to liven up or put life (dynamic change) in the environment of the space, as perceived by a person occupying the space. For example, the chaotic variation(s) in one or more environmental conditions may effect perception by an occupant in a manner that promotes an objective purpose of the space, although the variation may or may not mimic naturally occurring variations in the natural environment. The impact of the chaotic function control often is positive; but under some circumstances, the impact may be negative, e.g. to discomfort an unwanted visitor or intruder. In the specific examples, the expected occupants are human; however, the technologies discussed in the examples may be applied to control the environment of spaces intended for other biological occupants in addition to or instead of humans.

Additional objects, advantages and novel features of the examples will be set forth in part in the description which follows, and in part will become apparent to those skilled in the art upon examination of the following and the accompanying drawings or may be learned by production or operation of the examples. The objects and advantages of the present subject matter may be realized and attained by means of the methodologies, instrumentalities and combinations particularly pointed out in the appended claims.

BRIEF DESCRIPTION OF THE DRAWINGS

The drawing figures depict one or more implementations in accord with the present concepts, by way of example only, not by way of limitations. In the figures, like reference numerals refer to the same or similar elements.

FIG. 5A to 5F are examples of approximate representations of general trends or nominal curves, for natural abiotic environmental conditions of the atmosphere and lighting.

DETAILED DESCRIPTION

Figure 1A:
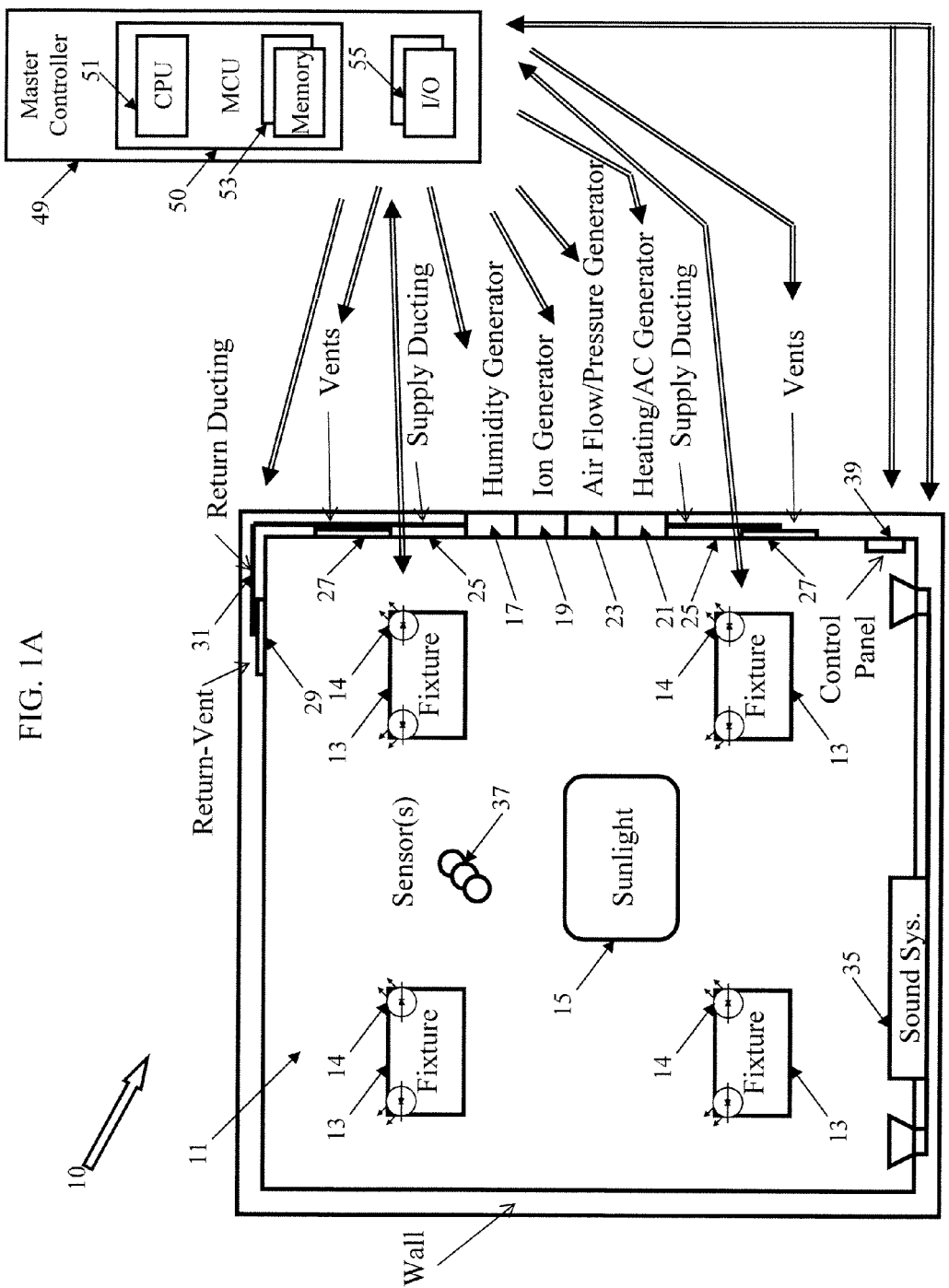
FIG. 1A is a plan view of an environmental control system for controlling lighting, sound and atmospheric characteristics.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

The various examples disclosed herein relate to technologies that control one or more conditions of a controlled environment, in such a manner that a characteristic of each controlled condition varies over a period of time at least in part in accordance with a chaotic function. The variable control, for example, may be applied to one or more characteristics of visible lighting of the environmentally controlled space. In addition or instead, one or more abiotic characteristics of the atmosphere in the controlled environment may be controlled based at least in part on a chaotic function. Examples also are discussed below that address sound in the environmentally controlled space.

There are a variety of components or factors in the environment that impact a human's perception of the surrounding environment, of time spent in the particular, environment the occupant's cognitive ability, or the like. The particular state(s) of various factors in a natural or controlled environment may calm or excite, may affect productivity favorably or unfavorably, and/or may tend to make occupants feel good, bad or indifferent. Some or all of the chaotic variations may often not be consciously perceptible by a human; however, sub-conscious perception of the chaotic variations still impacts the occupant's perception of the environment.

In our natural environment, the environmental conditions that often impact our general perception of our environment include abiotic components and biotic components. Abiotic components or factors are non-biological aspects of the environment, which typically are physical and/or chemical (but produced by inorganic chemical processes). Non-ionizing radiation in the environment, which encompasses visible light, infrared (IR) radiation and ultraviolet (UV) radiation, is a form or class of physical abiotic components that have a significant impact on a human's perception of or reaction to his or her environment. Such components in turn may have a number of variable characteristics. For example, visible light has a number of characteristics that vary in the environment in a manner that impacts human perception of and/or reaction to the environment. These characteristics of visible light include, by way of example, spectral content, intensity, color temperature, chromaticity difference or Delta_uv, and polarization. Other perceptible abiotic components of environmental conditions include characteristics of the atmospheric condition of the environment, such as temperature, humidity, air pressure, ionization, electromagnetic fields, precipitation, visibility, wind, smell (produced by non-biological condition) and chemical composition.

In contrast, biotic components or factors in our environment are caused or produced by biological processes in the environment. Examples of biotic characteristics of the atmospheric condition that have a significant impact on a human's perception of or reaction to his or her environment include circadian or other biorhythms and organic smells (produced by biological processes), such as the smell of fresh cut grass, the smell of the forest after a rain shower, the smell of fresh turned earth, and various bad organic odors.

Sound may also include components that impact perception of the environment. Sound may include both biotic components produced by organisms and abiotic components, e.g. produced by atmospheric, geographical or hydrological conditions.

The environmental control technologies under consideration here control one, two or more environmental components, factors or conditions thereof. Although such systems could control some biotic components, the specific examples discussed below generally control various abiotic environmental factors/conditions in an environmentally controlled space. Examples of controlled environmental components include characteristics of: light, atmosphere and/or sound. Reference now is made in detail to the examples illustrated in the accompanying drawings and discussed below.

FIG. 1A is a plan view of an environmental control system 10, in this example, dedicated to environmental control for an individual space 11 intended to be occupied by one or more people. In the example represented by the plan view of FIG. 1A, the occupant(s) are assumed to be human. However, the environmental control technology may be applied to spaces intended for other biological occupants in addition to or instead of humans. Full environmental control of the conditions and characteristics described, that is to say including characteristics of atmosphere in the example, typically would be implanted in an enclosed or indoor space; although some aspects of the techniques under consideration here may be applied to an outdoor setting where environmental control for a region or space might be feasible with respect to at least some relevant environmental components, such as control of lighting and/or sound (and possibly some aspects of the atmosphere), as in some outdoor venues.

The example shows control of lighting, atmospheric condition and sound in an enclosed indoor space 11. Hence, in the example of FIG. 1A, the space 11 may be a room in a building.

The environmental control system 10 includes conditioners, essentially various devices that control characteristics of conditions in the environmentally controlled space 11. For example, the system 10 includes one or more lighting devices that generate artificial light to control or condition the characteristics of lighting in the space 11 as well as a number of conditioners/generators to control various characteristics of atmospheric condition within the space 11. The system 10 may also provide a conditioner in the form of a sound generator or other sound system to control at least some aspects of sound within the space 11.

For ease of illustration and discussion, this example does not use the building heating, ventilation and air conditioning (HVAC) system as part of the atmospheric condition control. The system for environmental control of a particular space can use an existing building HVAC system for general temperature controls and augment environmental conditions for individual rooms with dedicated abiotic generators similar to those shown in the example. Atmospheric abiotic condition generators could also be implemented at the building level and be integrated with building HVAC. Lighting and/or sound could be controlled at the room, floor or building level. At least some aspects of the environmental control will often be settable or adjustable in each individual room or the like, so that occupants in each of a number of spaces can adjust settings for the environmental control in individually preferred ways.

While the schematic shows atmospheric condition generators mounted in one of the walls, they could also be mounted in the plenum space above the ceiling or in adjacent rooms. Alternatively, venting could also be placed in the ceiling. The illustrated locations on particular walls also are only given by way of an example. Similarly, the schematic shows sound system equipment mounted in or on a wall, although some or all of that sound equipment could be on a different wall or could be floor or ceiling mounted. Lighting equipment is shown as if mounted in the ceiling, although the lighting equipment could be at other locations on the ceiling or other positions in or about the perimeter of the space 11.

Turning to the specifics of the illustrated example in somewhat more detail, the system 10 includes a number of environmental conditioners, each configured to enable control of at least one characteristic of a respective environmental condition in the space 11.

The first type of conditioners condition the light in the space 11. In the examples, this first type of conditioner generates visible light for artificial illumination of the space 11. Human habitation often requires augmentation of natural ambient lighting with artificial lighting. For example, many office spaces, commercial spaces and/or manufacturing spaces require task lighting even when substantial amounts of natural ambient lighting are available. For many of these uses, the level of the light may be specified by one or more regulatory authorities. In the example, the first type of conditioner provides artificial lighting for the interior of the space 11 to augment any ambient light available in the space 11. Although artificial lighting in the space could be provided by floor or table lamps or the like, the exemplary system 10 uses lighting fixtures 13.

The plan view depicts the fixtures 13 as if mounted in the ceiling and oriented so that the light emissions from fixtures 13 are directed generally downward into the space 11. Such a downlight configuration, for task lighting or other similar illumination applications, is exemplary only. The fixtures or other types of lighting devices in the example may be at any location and/or orientation relative to the space 11 and the expected occupants to support a desired general lighting application appropriate for the usage or purpose intended for the space 11. For example, the downlight fixtures 13 provide direct lighting from above. As other examples, indirect lighting may reflect light off of a ceiling or wall surface, or at least some of the artificial lighting may principally illuminate an object in the room to be viewed by the occupants.

Each lighting device for the space 11 will include one or more controllable light sources, which may be implemented with any suitable light generation device. For example, some or all of the sources may take the form of one solid state light emitters, represented generally by the lighting emitting diode (LED) sources 14 shown in the drawing. LED based lighting devices such as the exemplary fixtures 13 may be implemented with LEDs alone or in combination with other sources, such as incandescent, fluorescent or organic LED (OLED) lamps and daylighting.

Operations of the sources 14 are controlled by a suitable controller, for example, to control intensity and possibly other characteristics of light generated by the sources and thus the overall artificial lighting within the space 11. Each fixture may have a controller, or a controller in one fixture may control the source(s) 14 within that fixture as well as some number of the other fixtures illuminating the particular space 11. The exemplary system 10 uses a central control configuration, however, in which one master controller 49 controls the characteristics of the light outputs of the fixtures 13 illuminating the space 11. The master controller 49 also controls the abiotic atmospheric condition generators and the sound system. The controller 49 may be implemented by dedicated logic circuitry or a host or personal computer: although in the example, the master controller 49 is implemented with a micro-control unit (MCU) 50. A user interface for master controller 49, and thus the system 10, utilizes a control panel 39. Aspects of the atmospheric condition and sound control, the master controller 49 and the control panel 39 will be discussed in more detail, after further discussion of lighting and related chaotic control.

When natural ambient light is available, ambient and task lighting should be integrated such that they do not work against one another. For example, natural ambient lighting should not be distracting to the task(s) to be performed in the lighted space. In the illustrated system 10, during daylight hours, the artificial lighting supplements natural sunlight provided to the space 11 via a source 15. Although shown in the center in the plan view, for example, as if provided as a skylight or daylighting device in the center of the ceiling, the source of sunlight 15 may be at other locations in the ceiling and/or take other forms such as windows or transparent doors in the walls of the space 11.

The lighting device(es) or equipment artificially illuminating for the space 11, in the example the fixtures 13 with the sources 14, are controlled so that one or more light characteristics of the environment within the space 11 vary at least in part in accordance with a chaotic function. The combined light output from one or some number of the fixtures 13 (but not all fixtures illuminating the space 11) may be controlled to implement the chaotic function(s) with respect to the overall artificial lighting in the room. Alternatively, the combined light output from each and every one of the light fixtures 13 illuminating the space 11 may be controlled so as to vary one or more light characteristics of the combined light output from each fixture 13 at least in part in accordance with a chaotic function. Control of the sources 14 in different fixtures 13 may produce variations of different characteristics of light, or all varying combined light fixture outputs may vary the same light characteristic or characteristics. Lighting characteristics that may be controlled in accordance with a chaotic function, include for example any or all of: intensity of light, spectral content of light, polarization of light, color temperature of light, and chromaticity difference (Delta_uv) of light from the Planckian locus.

The lighting equipment involved here, that is to say the fixtures 13 in the example illustrated in FIG. 1A, provides the main artificial illumination component in the space 11, rather than ancillary light output as might be provided by a display, or by or in association with a sound system, or the like. As such, the illumination from the fixtures, lamps or other elements controlled in accordance with a chaotic function is the main artificial illumination that supports the purpose of the space, for example, the lighting that alone or in combination with natural lighting provides light sufficient to allow occupants in the space to perform the normally expected task or tasks associated with the planned usage of the space. Often, such lighting is referred to as "general" lighting.

Where there are a number of lighting devices that illuminate the space 11, such as light fixtures 13 in this example, the intent is for the total illumination in the space 11 to exhibit chaotic behavior in the intended manner. To that end, chaotic variations among fixtures 13 may be in-phase with each other (same timing), for example, if there is synchronism and/or common control for the fixtures 13. Alternatively, operations of one or more of the fixtures 13 may be phase delayed relative to other fixture(s) to produce similar variations but different/delayed timings; or the various fixtures 13 may be running independently and therefore producing independent chaotic components (out of phase and with different variations). Other installations may be arranged with one or more lighting devices implementing the chaotic function control whereas one or more lighting devices may not implement the chaotic function control.

For information about examples of white lighting fixtures and associated controllers that may be programmed or otherwise configured in accordance with the discussion herein, attention may be directed to U.S. Utility patent application No. 13/218,148, Filed Aug. 25, 2011, entitled "TUNABLE WHITE LUMINAIRE," the disclosure of which is entirely incorporated herein by reference.

Other characteristic conditioners for the space 11, in the example of system 10, control characteristics of the atmospheric condition as well as sound in the space 11. In this example, the system 10 controls sound and a number of different abiotic characteristics of the atmospheric condition in the space 11.

Consider first the control of abiotic atmospheric components. Abiotic characteristics of the atmosphere within the space that may be controlled include for example any or all of: temperature, humidity, pressure, ionization, air movement, visibility and chemical composition, so as to vary at least in part in accordance with a chaotic function. Although the system could include conditioners for only one or two of these abiotic characteristics, the exemplary system actually controls four and possibly five of these characteristics.

The system 10 includes a humidity generator 17. The humidity generator 17 may include a humidifier and/or a dehumidifier. Operation of the humidity generator 17 raises and/or lowers the characteristic level of relative humidity in the atmosphere within the space 11 in accordance with a control algorithm, in this case, an algorithm implemented via master controller 49. The system 10 also includes an ion generator 19, which is controlled to establish an ionization level in the atmosphere within the space 11. Further, the exemplary system 10 includes a heating element and/or a cooling element represented by the generator 21. The generators 19 and 21 also are controlled by one or more control algorithms, which in the exemplary system 10 are implemented by the controller 49.

The system 10 will also include a blower and appropriate ductwork for airflow handling to and from space 11. The air handler may directly impact at least one characteristic of air flow relative to the space 11, such as air or wind speed. If the room is somewhat sealed or resistant to air leakage, a high enough speed of air flow into the space from the air handler can at least temporarily raise the air pressure within the space 11. Hence, in the drawing, the air handler is illustrated as an airflow/pressure generator 23. The air handler in generator 23 moves conditioned air from the generators 17, 19 and 21 through supply ducting 25 for emission into the space 11 through one or more air vents 27. The air handler also draws air from the space 11 through at least one return vent 29 and associated return ducting 31, for supply back to the generators 17, 19 and 21. The air handler may also draw air from outside the space 11, particularly if configured to impact pressure within the space 11.

In the illustrated system 10, the master controller 49 controls operation of the generator 23. Variation in the speed of operation of the blower forming the air handler of generator 23 changes the speed of airflow from the vents 27 and thus the speed of air flow into or "wind" within the space 11. The supply vents 27 may be relatively passive devices that are set to a particular opening size and direction; in which case, the speed of the blower of the air handler represents the only controllable variable with respect to airflow. However, the supply vents 27 may be electro-mechanically controllable devices managed by the controller 49. In such a case, controlled changes of the size of the vent opening may further change air velocity; and changing the direction of air emission from the vents 27 may also allow some control of "wind" direction within the space 11. Apparent wind characteristics may also be changed over time by selecting a different one or set of the controllable vents 27 for emission of conditioned air into the space 11 at different times. Although not shown, electro-mechanically controllable dampers may also be provided in the ducting 25 and/or 31 to provide some further control over air speed and possibly direction and/or pressure.

Hence, with the generators 17 to 23, the system 10 can control relative humidity (via generator 17), atmospheric ionization (via generator 19), temperature (via heating and AC generator 21), and air flow/speed and possibly pressure (via generator 23). If the system uses vents 27 and/or dampers of a type that is electro-mechanically controllable, the system 10 may also be able to control to at least some degree the direction of apparent air movement or 'wind' within the space 11. Operation of each the generators 17 to 23 is controlled by a suitable controller, to thereby control the respective characteristic(s) of atmospheric condition within the space 11. The vents 27 and/or dampers in the ducting 25, 31 may also be controlled by a suitable controller. Each generator, controllable vent or controllable damper may have an individual controller in or associated therewith, or a controller for one of the various atmospheric control elements 17 to 31 may control that element as well as some number of the other elements 17 to 31. As noted earlier, however, the exemplary system 10 uses a central control configuration. Hence, the master controller 49 controls the generators etc. that control abiotic characteristics of the atmosphere in the space 11. The master controller 49 is configured to control elements 17 to 31 in such a manner that one or more and possibly all of the controlled characteristics of the atmospheric condition of the space 11 vary at least in part in accordance with a chaotic function. The master controller 49 may apply the same or different control algorithms, including the same or different chaotic function components, to control of the various characteristics of the atmospheric condition of the space 11.

The exemplary system 10 also provides chaotic function control of sound within the environmentally controlled space 11. Hence, the system 10 includes a sound system 35 with associated speakers. The sound system 35 may be a conventional audio system for entertainment or the like in the space, or the system 35 may be a relatively simple sound generator. One or more characteristics of the sound output from system 35 are controllable. As with the other environmental conditioners, the generator of sound system 35 may include a controller. However, in the exemplary system 10, sound generation also is controlled centrally by master controller 49. For purposes of the present discussion, the master controller 49 is configured to apply chaotic function control to one or more of the following characteristics of the sound output from the sound system 35: overall volume or intensity of sound; spectral content of sound; timing and intensity of rhythm; timing, intensity and frequency of occurrence of particular sounds; and the like. In this way, one or more such sonic characteristics supplied to the space 11 are controlled so as to vary based at least in part on a chaotic function.

A number of the characteristics controlled by the system 10 are impacted by other inputs to the space 11. For example, light within the space 11 includes sunlight from source 15 as well as artificial light from the fixtures 13. Sound in the space 11 would include sound produced by occupants and/or other equipment in the space not controlled as part of the system 10 (e.g. any telephones, computers, televisions etc.). Temperature in the space also may be affected in part by heat entering the space 11 via any uncontrolled path, e.g. heat entering from other spaces or from outdoors. To insure that the control functions reflect actual conditions in the space 11, the system 10 also includes at least one sensor. The example includes a number of sensors shown collectively at 37.

Although shown together with other sensors in a generally central position on the plan view of FIG. 1A, the sensor 37 for any given condition or characteristic will be located wherever is deemed most effective for the particular condition detecting function. For example, a light sensor may be positioned to detect sunlight from source 15 as well as some light from the fixtures 13 so as to provide readings with respect to overall lighting in the space 11. Some characteristics may be detected by multiple sensors distributed about the space 11. Each sensor 37 may detect one or more relevant characteristics. Again using light as the example, a light sensor or sensors would detect the corresponding controllable characteristic(s) of light. For example, if intensity is controlled, the system 10 would include a light intensity sensor. If one or more color characteristics of light are controlled, then the system 10 would include corresponding color characteristic sensor(s). Although discussed as separate devices, some types of light sensors may be configured to detect one, two or more of these characteristics of the light within the space 11.

The master controller 49 would be configured to adapt the relevant lighting control functions with respect to control of sources 14 in the fixtures 13 in response to outputs from the relevant light sensors included in the particular implementation of the system 10. More specifically, for lighting control, the master controller 49 may be configured to control one or more characteristics of the visible combined light output of the fixtures 13 based on the relevant characteristic(s) of light in the space 11 sensed by one or more sensors 37, potentially including one or more aspects of the chaotic function-based variation. For example, when sensing high intensity day light in the space 11 with chaotic variations, the master controller 49 may reduce the intensity of the light output of the fixtures 13, reduce the magnitude of variation and/or adjust the timing of the variations of the artificial lighting produced by the chaotic control functionality. Instead of such inverse-phase control of the characteristics of the artificial component of the lighting in the space 11, sensor responsive adjustment may produce in-phase changes. For example, when the sensor(s) 37 for light characteristic(s) indicate an increase in intensity of daylight in the space, the master controller 49 may increase the intensity of the light output of the fixtures 13, increase the magnitude of variation and/or change the timing of the variations of the artificial lighting produced by the chaotic control.

The exemplary system 10 also includes one or more sensors for detecting other conditions/characteristics. The system 10 would typically include a temperature sensor and a humidity sensor. A pressure sensor, an air flow sensor and/or an ionization sensor may also be provided. The master controller 49 would be configured to adjust the relevant characteristic control in response to the condition or characteristic of the environment in space 11 as detected by the corresponding sensor 37. For example, the master controller 49 would control the heating/AC generator 21 and air flow generator 32 in response to sensed temperature to insure that the temperature within the space is kept within some range of an established set-point temperature. Parameters of the applicable chaotic function may also be adjusted in response to sensed temperature of the space 11. Similar sensor responsive control may be applied to other characteristics of the atmospheric condition in the space 11, such as relative humidity, ionization, air speed (e.g. in the ducting 25 or as passing out through the vents 27) and pressure.

The system 10 may also include a sonic sensor for detecting sound, among the sensors 37. If provided, such a sensor would detect at least the level of the sound within the environmentally controlled space 11; although the sensor(s) for sound detection may detect other characteristics of sound such as frequency. As with the other characteristics of the environment in the space 11, the master controller 49 would be configured to adjust the sound generation by the system 35 based on sound detection by the applicable sensor(s). For example, the master controller 49 could reduce or turn OFF sound output from the sound system 35 in response to increased or high levels of sound detected in the space 11 by the sensor. Such sensor responsive sound control may also adjust parameters, such as degree and/or timing, of the chaotic variation of sound. If a microphone is used as or included in addition to the sonic sensor, the system 35 could implement a noise cancellation function to generate out-of-phase sound to cancel at least some sound in the space deemed to be unwanted noise.

As noted earlier, the exemplary system 10 utilizes a master controller 49 that is implemented with a micro-control unit (MCU) 50. The MCU 50 in the example is a microchip device that incorporates a processor serving as the programmable central processing unit (CPU) 51 of the MCU and thus of the controller 49 and the system 10. The MCU 50 also includes one or more memories 53 accessible to the CPU 51. The memory or memories 53 store executable programming for the CPU 51 as well as data for processing by or resulting from processing of the CPU 51. The CPU implements the program to process data in the desired manner and to thereby generate desired control outputs, for example, to control the other elements of the system 10 to implement the environmental control for the space 11 with chaotic function variation as discussed herein.

The master controller 49 also includes one or more input/output (I/O) interfaces 55. The interface or interfaces 55 provide communication for the master controller 49 with the other elements 13 to 39 of the environmental control system. For example, some of these communication capabilities enable the master controller 49 to receive data or other inputs from various elements such as sensors 37 and control panel 39. The interface or interfaces 55 also provide control data or signals from the controller 49 to various conditioners such as 13 and 17 to 23 and to the vents and/or any dampers if controllable. At least one I/O interface 55 also provides data to the control panel 39 to control the presentation of system information to the user. The type and number of the I/O interfaces 55 depends on the system configuration, for example, on the communication capabilities of the various conditioners, etc. Each interface may be an optical or electrical wired communication device, or each communication interface 55 may be an optical or radio frequency type wireless communication device, depending on the connectivity and/or communication facilities of the particular building that includes the environmentally controlled space 11.

Although not shown, the same or an additional interface or transceiver may be included, which provides network communications for the master controller 49 and thus for the system 10. In this way, the system 10 may be in communication with other equipment or systems, for example, to report status to and receive command inputs from a central control computer or a remote user terminal device. Operations of the system 10 controlling the environment for one space 11 may be coordinated with operations of other similar systems controlling the environment for other spaces in the same building, on the same campus, or the like.

As noted earlier, the system 10 also includes a control panel 39. The panel can be at any convenient location about the space 11 or may be a portable device. Alternatively, the panel may be provided at a central control location for the building or the like that includes the environmentally controlled space 11.

The control panel 39 can take any form to provide information output to a user or occupant of the space 11 and to receive inputs from the user or occupant for input to the master controller 49. The control panel, for example, may take the form of a data display and a keypad or key board. Another example of a suitable control panel is a touch screen display.

The control panel 39 provides the user interface for an occupant of the space 11. The user interface will allow the occupant or other user to control at least one and possibly all of the environmental components handled by the system 10. For lighting, for example, the user interface provided via the control panel 39 may offer the occupant a simple ON-OFF control and/or dimmer input; or the user interface may offer more sophisticated control and data entry/output for example to allow the user to see and set desired points for one or more color characteristics as well as light intensity. For some characteristics, such as temperature and/or humidity, the user interface provided via the control panel 39 may offer the occupant current measured values and the ability to input set-point values. Time of day, week etc. may also be input via the user interface to allow the user to set different set points for different times, for any of the controllable characteristics.

Also, for some installations, it may be desirable to provide control over the chaotic function variations via the user interface provided by the control panel 39. For example, an occupant in one room may prefer less variation in lighting, temperature, etc. than an occupant in another room. Hence, the user interface might allow occupants in each of the rooms of a building to individually control the chaotic function related variations in the different rooms.

As outlined in the discussion of the system 10 of FIG. 1A, the system 10 includes generators and the like controlled by a controller 49 so as to affect characteristics of environmental conditions in a controlled space 11. In particular, the environmental control varies some or all of the controlled characteristics in accordance with one or more chaotic functions. As such, the system implements a method of environmental control. To appreciate the methodology, it may be helpful to consider a simplified example with respect to the flow chart of FIG. 1B. The flow chart shows several different routines running somewhat in parallel for various conditions/characteristics controlled by the system 10. Although shown as independent parallel processes, the control algorithms for some or all characteristics may be inter-related or integrated into a single overall process.

For a first environmental condition, say for example, intensity of light in the space 11, the controller 49 will store a setting (step SL1) in memory 53. The setting may be pre-established by the manufacturer in accordance with regulatory requirements, input by an authorized technician or the like of the entity maintaining the space 11, or input by an occupant via the control panel 39.

For at least some conditions/characteristics, such as light intensity in this first example, the system 10 will also detect the relevant parameter of the environment in the space via the appropriate one of the sensors 37. Hence, step SL2 involves sensing the intensity of light within the space 11. The light sensed will include any ambient light and often will include some light emitted from the fixtures 13 or other lighting devices that provide artificial illumination of the space 11.

Based on the applicable setting and the sensed condition characteristic, the CPU 51 controls the appropriate conditioner or generator. In the light intensity example, the CPU 51 sends instructions to the controlled light fixtures 13 to operate the sources 14 to generate light output of amounts in accordance with the control program for lighting within the space (SL3). As shown at step SL4, the control of the fixtures 13 includes control of output of one or more of the sources 14 to automatically vary at least one characteristic of a lighting of the environmentally controlled space over a period of time at least in part in accordance with a chaotic function. Continuing with the light intensity example, the CPU 51 sends instructions to one or more of the fixtures to control the source output intensity thereof so that the overall light within the space 11 varies in accordance with the appropriate light intensity control algorithm, which includes a chaotic function component.

Figure 1B:
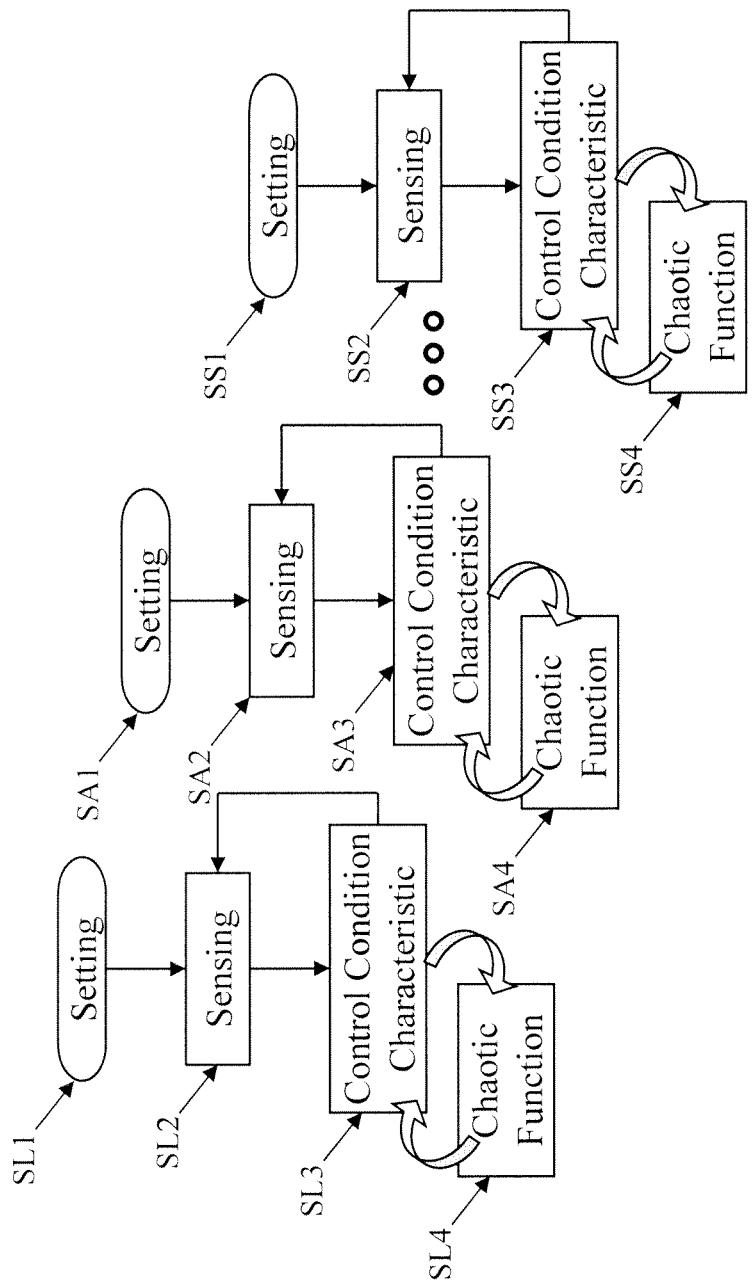
FIG. 1B is a simplified flow diagram of procedures that may be implemented by an environmental control system like that of FIG. 1A.

The system 10 controls other environmental factors in a similar manner. In addition or instead of light intensity, the system 10 may control other light characteristics of the types discussed above. In the example of FIG. 1B, the system also similarly controls one or more characteristics of the two other environmental conditions, atmosphere and sound of the space 11.

We will consider next the steps involved in controlling one of the characteristics of the atmospheric condition in the space 11. For the atmospheric condition, say for example, temperature in the space 11, the controller 49 will store a setting (step SA1) in memory 53. Some atmospheric related characteristics may have a setting that has been pre-established by the manufacturer or by an authorized technician or the like of the entity maintaining the space 11. In many installations, however, an environmental control system 10 will allow an occupant to input a desired comfortable temperature setting via the control panel 39.

For at least some characteristics of the atmospheric condition, such as temperature in this second example, the system 10 will also detect the relevant parameter of the environment in the space 11 via the appropriate one of the sensors 37. Hence, step SA2 involves sensing the temperature of the atmosphere within the space 11.

Based on the applicable setting and the sensed condition characteristic, the CPU 51 controls the appropriate generator. In the temperature control example, the CPU 51 sends instructions to the Heating/AC generator 21 to heat or cool air flowing through ducting 25 and vents 27 into the space 11 to control the room temperature (step SA3) within the space. As shown at step SA4, the control of the characteristic of the atmospheric condition includes control of output of one or more of the generators to automatically vary at least one characteristic of the atmospheric environmental condition in the space over a period of time at least in part in accordance with a chaotic function. Continuing with the temperature control example, the CPU 51 sends instructions to the generator 21 to heat or cool the air in the space 11, so that the temperature within the space 11 varies in accordance with the appropriate control algorithm, which includes a chaotic function component. In addition, the system 10 may control other characteristics of the atmospheric condition of the types discussed above, in a similar manner, including chaotic function variation.

We will consider next the steps involved in controlling one of the characteristics of the sound in the space 11. For sound, say for example, volume in the space 11, the controller 49 will store a setting (step SS1) in memory 53. Again, some characteristics may have a setting that has been pre-established by the manufacturer or by an authorized technician, although the volume setting would likely be a parameter that an occupant can input via the control panel 39.

For at least some characteristics of the sound, such as sound volume in this third example, the system 10 will also detect the relevant parameter of the environment in the space via the appropriate one of the sensors 37. Hence, step SS2 involves sensing the volume of the sound within the space 11.

Based on the applicable setting and the sensed condition characteristic, the CPU 51 controls the sound generation by sound system 35. In the volume control example, the CPU 51 sends instructions to the sound system 35 to raise or lower the volume of the sound output into the space 11 via the system speakers, and thus control the sound volume (step SS3) within the space. As shown at step SS4, the control of the characteristic of the sound includes control of output of the sound system 35 to automatically vary at least one characteristic of the sound in the space 11 over a period of time at least in part in accordance with a chaotic function. Continuing with the volume control example, the CPU 51 sends instructions to the sound system 35 to control the intensity of the output sound, so that the volume within the space 11 is controlled in accordance with the appropriate control algorithm, which includes a chaotic function component. In addition, the system 10 may control other characteristics of the sound of the types discussed above, in a similar manner, including chaotic function variation.

As discussed to this point one, two or more characteristics of an environmental condition of the space 11 and/or one, two or more characteristics of a different environmental condition of the space 11 are controlled by the system 10, in a manner that includes one or more chaotic function components. Some or all of the chaotic variation(s) may often not be consciously perceptible by an occupant of the space; however, sub-conscious perception of the chaotic variation(s) will still impact the occupant's perception of the environment in the space.

Where there are a number of algorithms for controlling components or factors of the environment of a particular space 11, as in the example of FIGS. 1A and 1B, the intent is for each chaotically controlled characteristic to exhibit chaotic behavior in the intended manner. To that end, chaotic variations among fixtures 13, for example, may be in-phase with each other (same timing), for example, if there is synchronism and/or common control for the fixtures 13. Alternatively, operations of one or more of the fixtures 13 may be phase delayed relative to other fixture(s) to produce similar variations but different/delayed timings; or the various fixtures 3 may be running independently and therefore producing independent chaotic components (out of phase and with different variations). Other installations may be arranged with one or more lighting devices implementing the chaotic function control whereas one or more lighting devices may not implement the chaotic function control. In a similar manner, characteristics of other conditions such as those of atmosphere and sound that are chaotically controlled may vary chaotically in an in-phase or an out-of-phase manner relative to each other and/or relative to variations of the lighting characteristic(s).

The chaotic functional control or variation of any or all of the environmental characteristics may be implemented using a variety of control algorithms. It may be useful at this point in the discussion to consider chaotic functions in more detail, both in general terms and in terms of application thereof to control of specific conditions/characteristics controlled by an environmental control system like system 10 of FIG. 1A.

In science and mathematics, chaos is not a lack of order. To the contrary, chaos is an apparent lack of order in the outcomes of a complex dynamic system that actually may be deterministic. A chaotic system often is deterministic in that it follows one or more rules; however, system results are unpredictable and appear random or lacking in order because the results are not readily predictable, particularly in the long run. Hence, a chaotic system is one that operates in a dynamic manner and its dynamic operations are highly sensitive to initial conditions. The outcomes at a point in time are often determined by the parameters occurring at one or more preceding points in time, which serve as the inputs to the deterministic system in driving the current outcomes. Sensitivity to initial conditions means that small differences of initial conditions can yield significantly different results. In a system that depends on prior conditions, the prior conditions become the inputs for current or future determined outcomes; therefore such a chaotic system tends to be highly sensitive to the conditions leading up to current time. The sensitivity to initial conditions, say the current and prior conditions that serve as 'initial conditions' for prediction of future outputs, makes prediction of long-term outcomes difficult or impossible.

Chaotic behavior occurs in many natural systems. Weather, for example, is a naturally occurring chaotic system. It is relatively easy to observe present conditions and track past conditions, for use in predicting the weather. However, even with sophisticated computer modeling and increasingly comprehensive data accumulation, weather is not readily predictable beyond a few days or a week. Examples of the chaotically varying characteristics of the weather include conditions like air temperature, air pressure, humidity, precipitation, visibility, wind speed, and wind direction (in two or three dimensions).

In an outdoor environment, parameters of natural lighting produced by sunlight, shading and/or reflection of light in the environment and light transmission through the atmosphere also form a naturally occurring chaotic system. Examples of the chaotically varying characteristics of naturally occurring lighting include intensity of light flux, color temperature of the light and chromaticity difference or Delta_uv (distance of color characteristic point off of the Planckian locus, in uv color space).

The human nervous system also is a chaotic system. However, aspects of human perception are, after eons of evolution in Earth's natural environment, accustomed and even somewhat attuned to natural variation of characteristics of the environmental conditions, including chaotically varying characteristics such as those of the weather and of natural lighting. As a result, humans are actually sensitive to variations, including chaotic variations at levels and rates that may not be readily or consciously perceptible. However, sensing of such variations does impact the human nervous system in ways that may affect human mood and/or performance. Compared to natural conditions, controlled characteristics of indoor conditions have tended in the past to be relatively static over substantial periods of time each day.

The systems and procedures discussed herein by way of examples, however, incorporate chaotic variations into control functions of an environmental control system, in a manner intended to support or facilitate an objective purpose of a space for which the system controls environmental conditions. Depending on the purpose(s) of the space, the environment in a controlled space can calm, the environment can excite, the environment can affect productivity favorably or unfavorably, and/or the environment can make occupants feel good, bad or indifferent. For many applications, promotion of the purpose of the space will involve lighting control and/or control of other characteristics or conditions in a way that may be considered positive or pleasant in some manner. However, for some purposes and/or at some times, a negative or unpleasant impact may be appropriate, e.g. to encourage unwanted visitors (human or animal or insect, etc.) to leave a space or even to impair an intruder's perception while intruding into a secure space.

The chaotic variation of an environmental characteristic may be similar to the corresponding characteristic condition occurring in nature; however, the environmental control need not particularly mimic the relevant natural condition. In many settings, the variation need not track that occurring in nature. Rather than implementing natural changes in conditions in the environmentally controlled space, for at least those purposes where aspects of the natural changes support the intended purpose, the controlled system adds analogous components via chaotic function control, for example, to liven up or put life (dynamic change) in one or more of the characteristics of the environmental conditions in the environmentally controlled space.

Some examples of chaotic functions may be defined by three or more linked differential equations, often where each equation has one or more non-linear terms and the coefficients of the terms configure the system of equations for operation near or at a transition point from orderly to disorderly behavior. However, other formulae may be used. A somewhat simpler chaotic function maybe expressed by an equation like the following:

$$X_{n+1} = rx_n(1-x_n) \qquad (1)$$

(Source: Wikipedia, "Chaos Theory," en.wikipedia.org/wiki/Chaos_theory)

Figure 2:
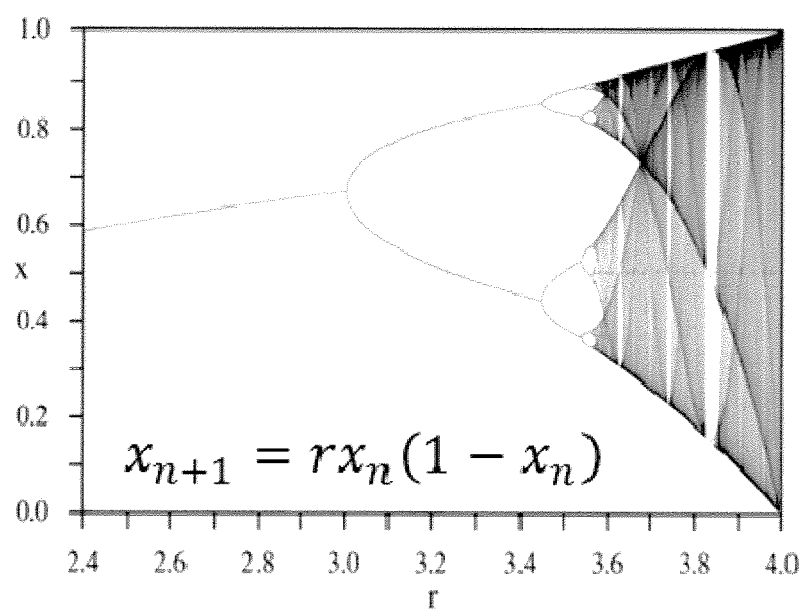
FIG. 2 is a graph showing a relationship of states of a variable to a range of coefficient values for an equation that may define a chaotic control function, for a simple example.

In equation 1 above, the variable x for the next time point n+1 is dependent on the value of x of the current time point n. The initial condition for $x_{n+1}$ is $x_n$. FIG. 2 is a graph (from the source Wikipedia article noted above) showing possible outcomes of x for different values of the coefficient r. The example uses a damping type of equation that creates a chaotic function.

Figure 3A:
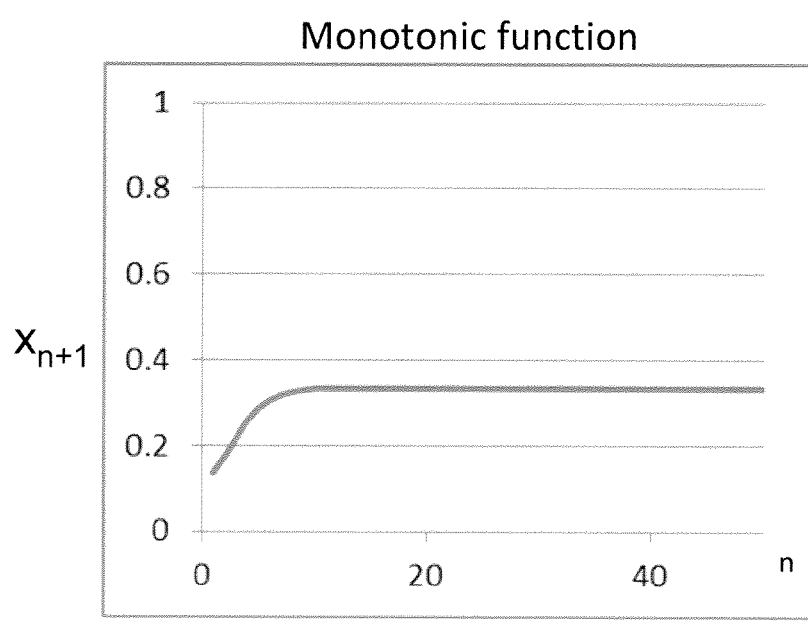
FIGS. 3A to 3E show the resulting functions, achieved using different values for the coefficient, for the equation represented in FIG. 2.

For values of r below approximately 3.0, x is a relatively monotonic function. FIG. 3A shows the function $x_{n+1}$, for a range to values n, in a case in which the coefficient r is 1.5. As shown, the function quickly reaches a value of approximately 2.7 and stays at that value. The outcome of the function is monotonic at that value for values of n above approximately 9 or 10. In this state produced by the low value of r, variation as a function of n is minimal and damps out quickly.

Figure 3B:
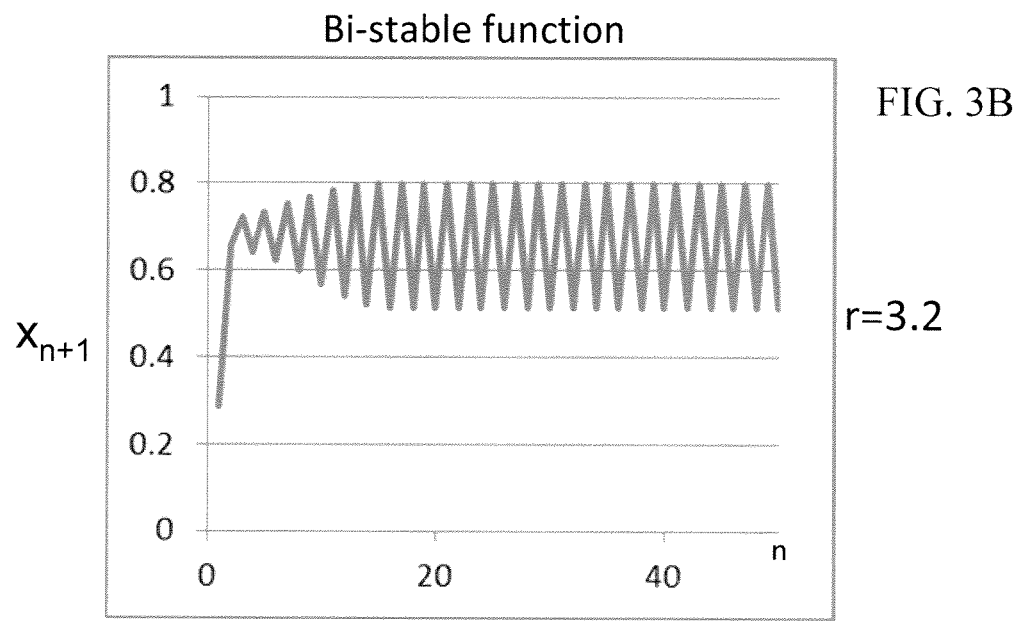

Returning to FIG. 2, in the range of r from approximately 3.0 to 3.4 for the value of the coefficient of r, there are essentially two possible outcomes for x. In this coefficient range, the function of x tends to be bi-stable. By way of an illustrative example of a bi-stable state of the function of equation (1), FIG. 3B depicts the function $x_{n+1}$, for a range to values n, in a case in which the coefficient r is 3.2.

Figure 3C:
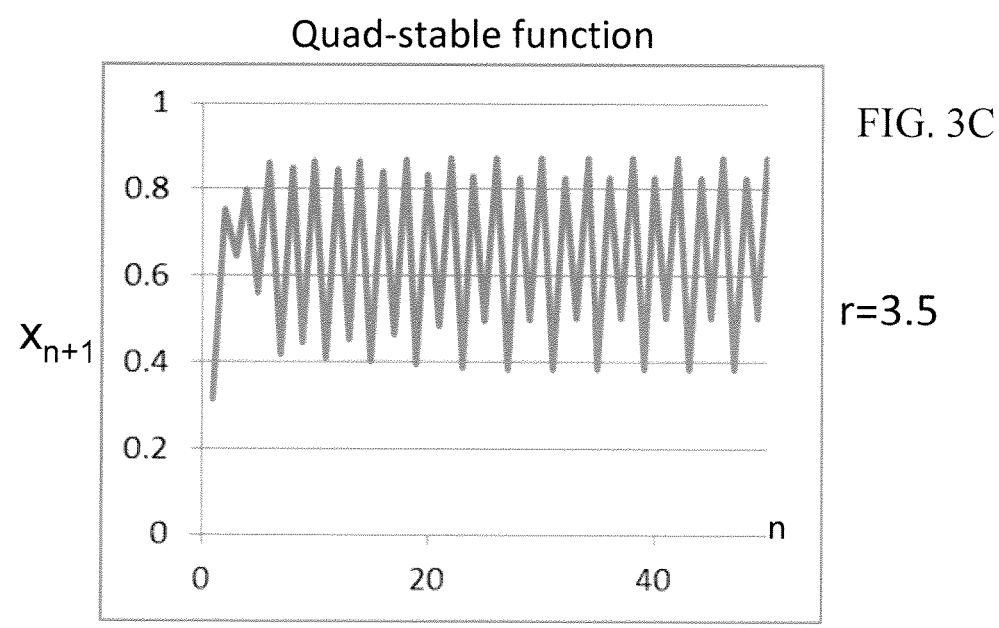

Returning to FIG. 2, in the range of r from approximately 3.4 to 3.6 for the value of the coefficient of r, there are essentially four possible outcomes for x. In this coefficient range, the function of x tends to be quad-stable, i.e. a function that exhibits essentially four regularly repeating outcomes. By way of an illustrative example of a quad-stable state of the function of equation (1), FIG. 3C depicts the function $x_{n+1}$, for a range to values n, in a case in which the coefficient r is 3.5.

Figure 3D:
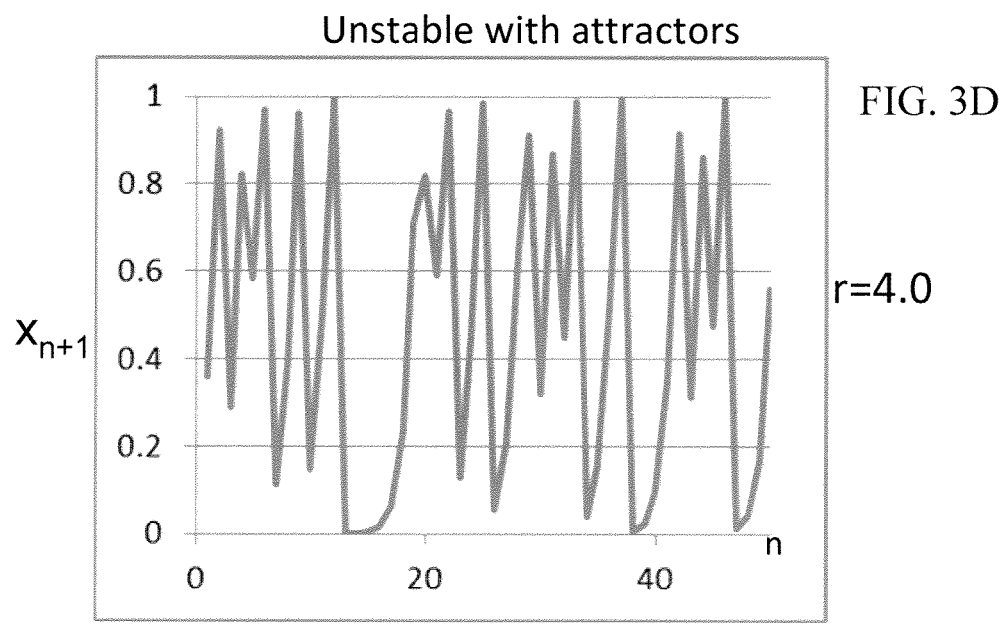
Figure 3E:
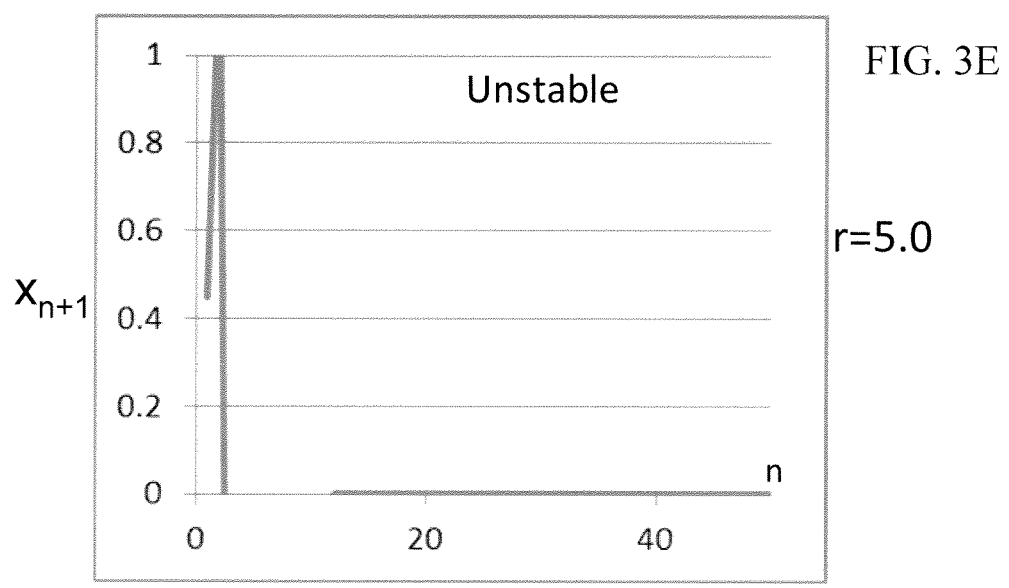

As shown in FIG. 2 the number and variances of the function x for values of the coefficient r increase significantly for higher values of r, say above 3.6 or 3.7. In the early part of this range, the function x is somewhat unstable but tends to be attracted to return in somewhat irregular manner to or near a number of recurring values, referred to as attractors. FIG. 3D illustrates an example of the function of equation (1) in which a coefficient value for r is 4.0, which produces outcomes for $x_{n+1}$ that vary in a somewhat unstable manner but with attractors. For a higher coefficient value, say 5.0 by way of an example, the function becomes completely unstable as shown by way of example in FIG. 3E.

For most of the environmental controls by a system like that of FIG. 1A, for example, the system will most likely operate with one or more chaotic functions configured in a state of a type that provides unstable with attractor type variations analogous to the example of FIG. 3D. However, for some purposes, quad-stable or by-stable may be used. Fully unstable would probably not be used. Hence, for purposes our discussions of further examples of environmental control in accordance with a chaotic function, we will assume use of the chaotic function in an unstable state with attractors. If the function (1) is used as the chaotic function, the coefficient r might be set to a value that produces outcomes like that of FIG. 3D. Attractors are results that the function tends to go back to from time to time, although not in an actual repeating pattern. In the 4.0 example of FIG. 3D, xn+1 tends to go back to or close to the same minimum and maximum values in an irregular manner over time n (quasi-pattern), although the minima and maxima not exactly the same, the curvatures to and from maxima and minima vary, and there is not any real exact periodicity.

The human brain also may be thought of as a chaotic system. The human brain tends to vary between states that are neither monostable nor unstable chaotic. Instead, the brain tends to vary in a state range from bi-stable, through quad-stable up to states that may be somewhat unstable with attractors.

Figure 4A:
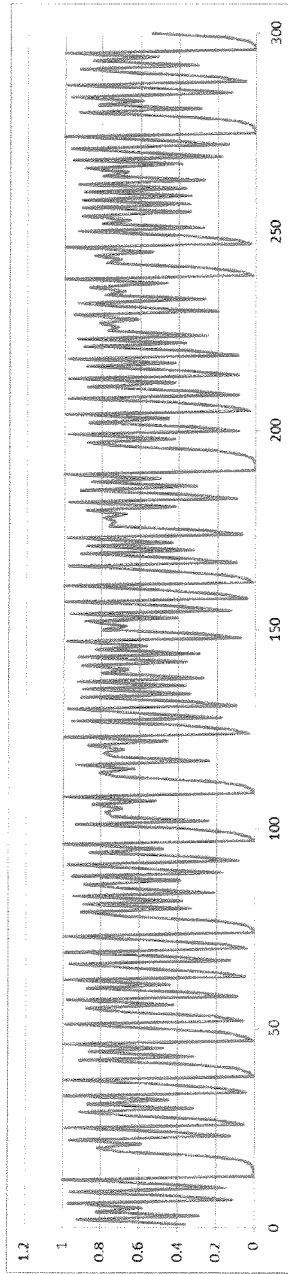
FIGS. 4A to 4C, respectively show a chaotic function in an unstable-with-attractors state, a portion of a sine wave and an example of a combination of the chaotic function and the sine wave portion.
Figure 4B:
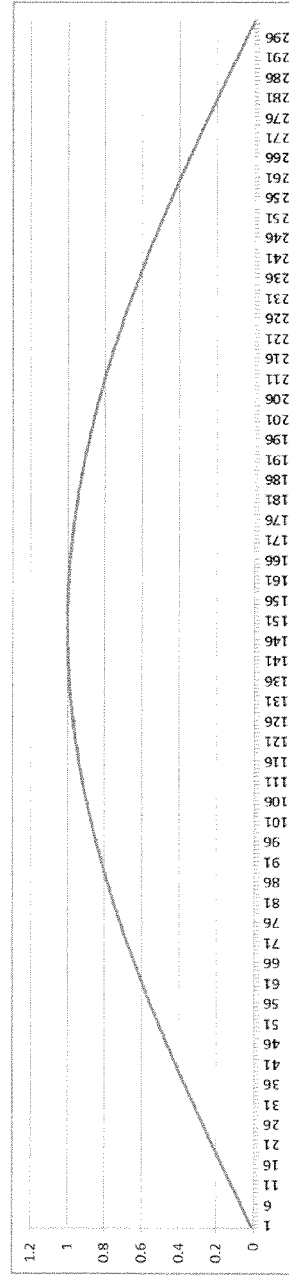
Figure 4C:
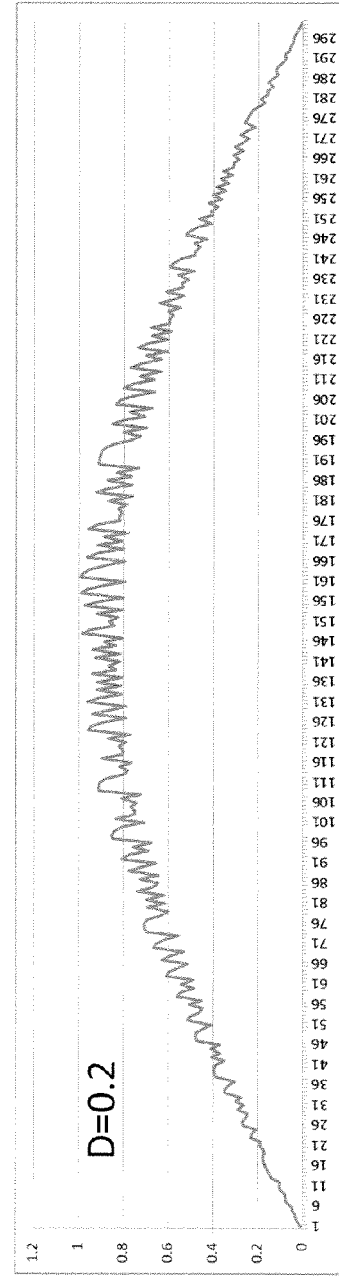

FIGS. 4A to 4C are function graphs useful in explaining a chaotic equation combined with a sine equation. FIG. 4A shows a chaotic function in an unstable-with-attractors state the same as or similar to that of FIG. 3D, over 300 units of time. The units of time may be seconds, minutes, hours, or factions or multiples of any such units, depending on the particular lighting characteristic, sound characteristic or characteristic of the atmospheric condition being controlled and the purpose or objective that is supported by the respective environmental control function. For example, different time scales may be applied for controlling intensity, color temperature, Delta_uv, etc., in the same or different lighting device or system. Similarly, different time scales may be applied to control of different characteristics of sound and/or atmospheric condition.

The master controller 49 may be configured to apply the chaotic function directly to control the output characteristic of the relevant generator or conditioner, to vary the respective environmental component in accordance with the chaotic function. However, in many implementations, the master controller 49 may be configured to control operation of each respective conditioner so that the respective characteristic(s) of the various environmental conditions in the space 11 varies in accordance with a combination of a nominal function over the period of time and the chaotic function. The nominal function may be a fixed value (e.g. the corresponding setting) or a variable value. In other examples, the nominal function is a variable function added to or otherwise superimposed on a setting value.

FIG. 4B shows a portion, in this case a half-wave or 180°, of a sine wave function. The time scale for the sine wave is the same as that used for the chaotic function in FIG. 4A; and again, the magnitude is normalized to a range from 0 to 1. FIG. 4C shows a combination of the chaotic function with the sine wave. The chaotic function may be combined with the sine wave in a variety of ways. In the example, the outcome of the sine equation is multiplied by one minus the outcome of the chaotic equation times a dampening parameter D. The dampening parameter D limits the variation caused by the chaotic function. In the specific example D=0.2.

The sine function is used here as just an easy example of a variable nominal function or variable component that may be used in combination with a minimum or established setting value to form a nominal function. However, many functions in nature tend to vary in a manner that can be somewhat approximated by a sine wave. It may be helpful to consider several examples.

Figure 5A:
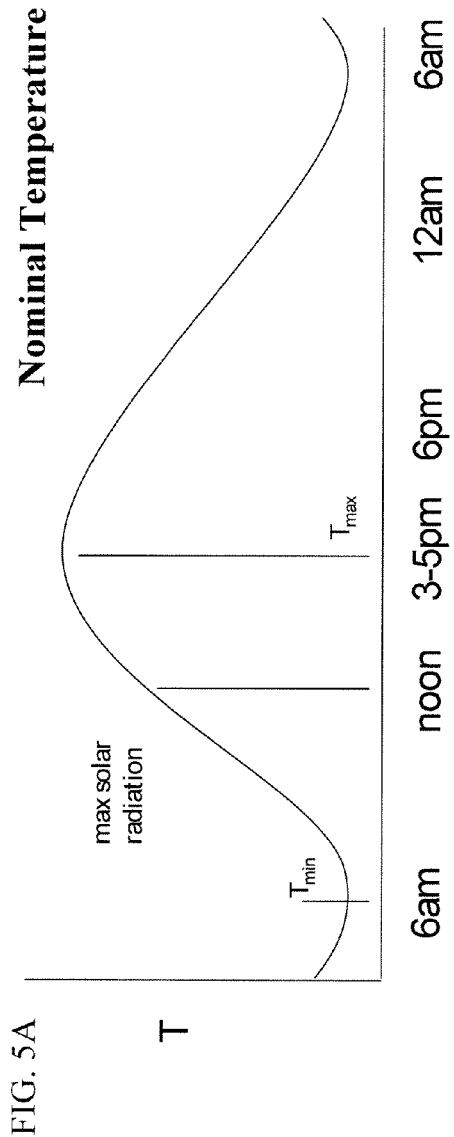

FIG. 5A depicts an example of a nominal temperature curve. Actual curves can vary greatly due to elevation and location. For example, locations at higher elevations will see more variability from low to high than at lower elevations. Locations near the equator will see a flatter curve. As shown, temperatures vary repeatedly over a twenty-four hour period between daily mina and maxima, although the minimum and maximum values are often different each day. Temperature often reaches its maximum around mid-afternoon. In many locations, the timing of this cycle slowly shifts with the seasons. A portion of a control curve intended, for example, to approximate a portion of the illustrated temperature curve might use a part of a sine wave like that of FIG. 4B with the peak in the mid-afternoon. The range of variation in the sine wave component of the control function, however, would likely not be as great as that of the outdoor environment and would likely be centered around a comfortable set-point.

Figure 5B:
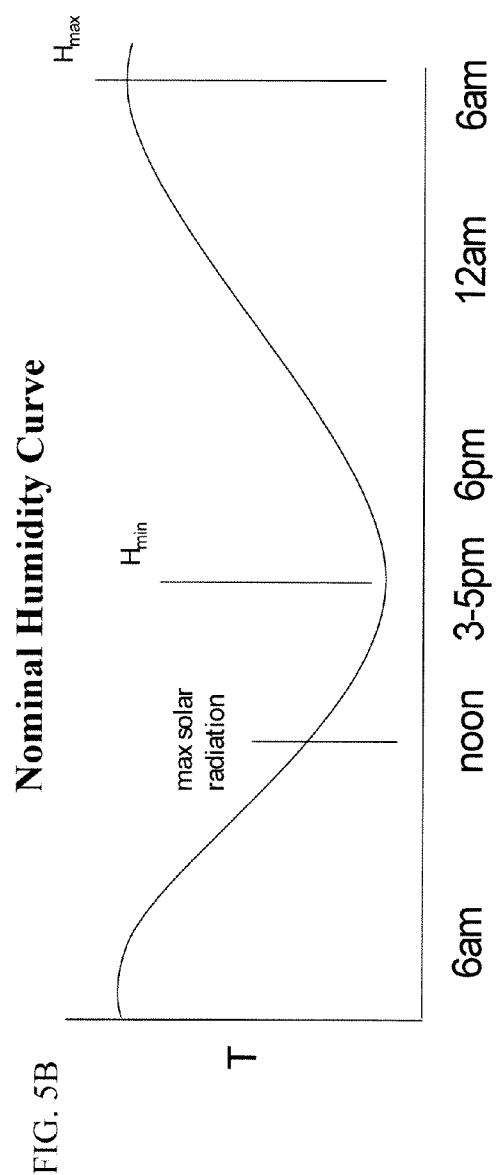

FIG. 5B depicts an example of a nominal humidity curve. Humidity levels are nominally the inverse of temperature. When daily temperatures are lowest, humidity is higher. Conversely, humidity levels are lower when temperature is highest. Actual curves can vary greatly due to elevation and location. Again, a sine wave can be used to provide a component approximating a daytime portion of such a natural trend. In an example of an environmental control system that controls humidity based at least in part on a combination of a nominal function and a chaotic function, the maximum extents or range of humidity would be ~31-41%.

Figure 5C:
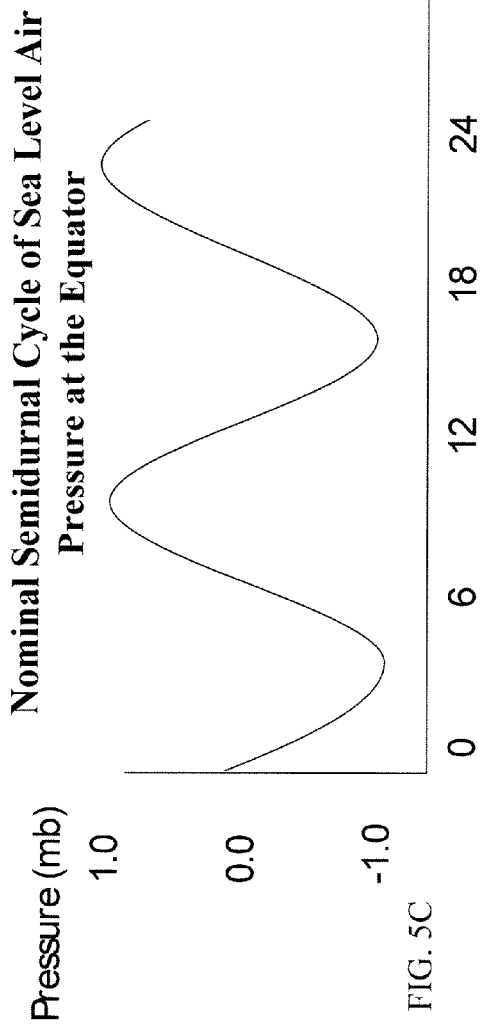

FIG. 5C shows an example of a nominal semidurnal cycle of sea level air pressure at the equator. Air Pressure peaks at 10:00 AM and PM, dips at 4:00 AM and PM. In an example of an environmental control system that controls air pressure, based at least in part on a combination of a nominal function and a chaotic function, the maximum extents or range of air pressure would be ~980-1050 mb.

Figure 5D:
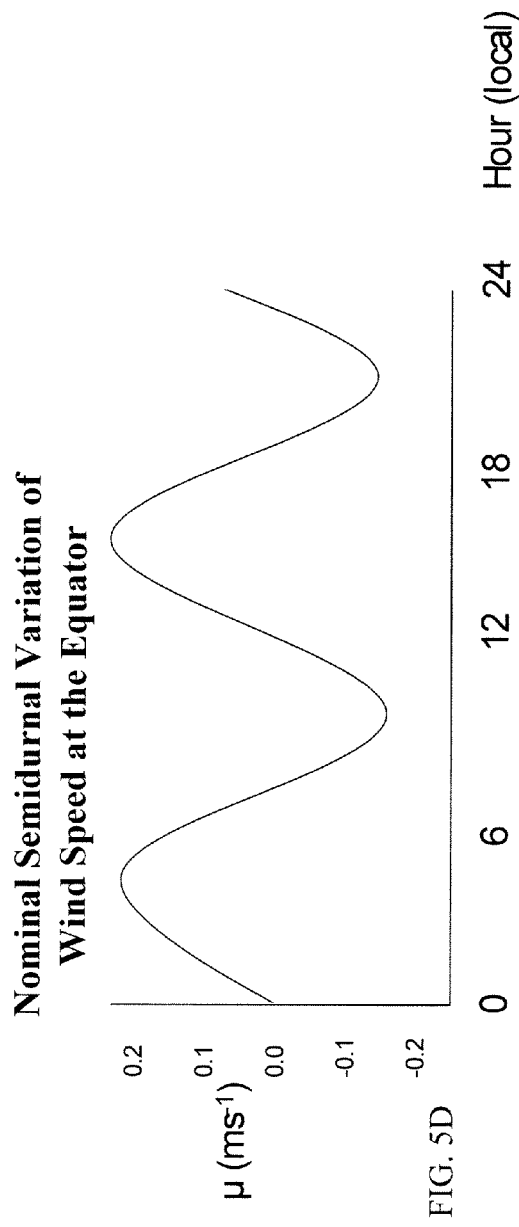

FIG. 5D is an example of a nominal semidurnal variation of wind speed at the equator. In an example of an environmental control system that controls wind speed, In an example, airflow or 'wind speed' would be very low, on the order of $0.15 \text{ ms}^{-1}$.

FIG. 5E depicts a rough approximation of the general trend (without specific values) over the daylight hours for a nominal or normalized intensity curve for natural sunlight. FIG. 5F shows an example of a nominal curve for color temperature in degrees Kelvin (K) over the hours of daylight. Color Temperature at night is ~10,000° K. During periods of overcast or in shady areas, color temps are ~7,500° K Control of environmental condition characteristics in the system 10 could utilize curves like those of FIGS. 5A to 5F. Actual implementations, however, will often at most introduce a trend or component that approximates or portion of a natural variation, without mimicking the full range of natural variation. Consider light intensity by way of a specific example. Rather than using an approximation of the natural trend from zero to maximum and back to zero (see FIG. 5E), for artificial light, some amount of artificial light will normally be provided at all times when the lighting device or system is ON to provide light. Hence, rather than use the curve of FIG. 4A or FIG. 4C as the lighting control function, the lighting device or system will typically add the function to or otherwise superimpose the function on the current setting value for the relevant light parameter.

Using the function of FIG. 4C as the example, the function could be added onto the otherwise normal full ON intensity value or to a somewhat lower intensity value selected by the user via a dimmer like input via the user interface offered by control panel 39. In this manner, the intensity of the output light would vary above or about the set intensity value in accordance with the function illustrated in FIG. 4C. As a result, over the assigned period, the actual light intensity would be the selected intensity plus a variable amount determined by the function of FIG. 4C.

Of course, instead of or in addition to such control of intensity, a controller 39 may control one or more other characteristics of the visible light output from the source(s) 14, such as spectral content of light, polarization of light, color temperature of light, and chromaticity difference (Delta_uv) of light from the Planckian locus, in a similar manner. Using color temperature as another example, the function of FIG. 4A reduced by application of a coefficient, say corresponding to 10%, could be multiplied by a color temperature setting to combine the chaotic function with the nominal value function. Alternatively, to achieve a general trend more like that shown in FIG. 5E, the combined function of FIG. 4B reduced by application of a coefficient, say corresponding to 10%, could be multiplied by a color temperature setting to combine the chaotic function with the nominal value function.

Other techniques may be used to combine a selected function, that includes a chaotic function component, e.g. like the functions shown in FIGS. 4A and 4C, with a setting or other type of target value for the particular lighting condition to which the chaotic function control is applied. Lighting control has been used as an example, however, the techniques outlined above relative to FIGS. 4A to 4C and FIGS. 5E and 5F can be applied to the other environmental conditions and characteristics thereof controlled by a system like system 10 in FIG. 1.

Figure 6A:
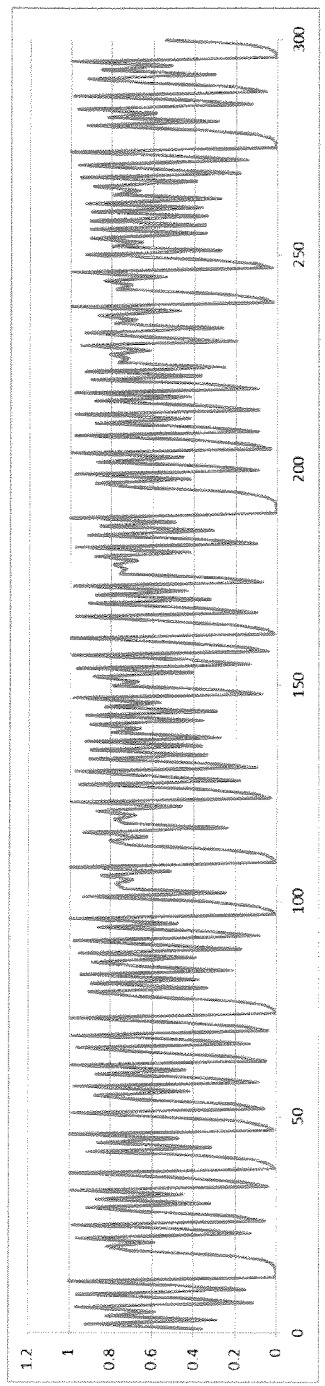
FIGS. 6A to 6C, respectively show the chaotic function in the unstable-with-attractors state, another chaotic function in a similar state but using a different timing rate and an example of a combination of the two chaotic functions.
Figure 6B:
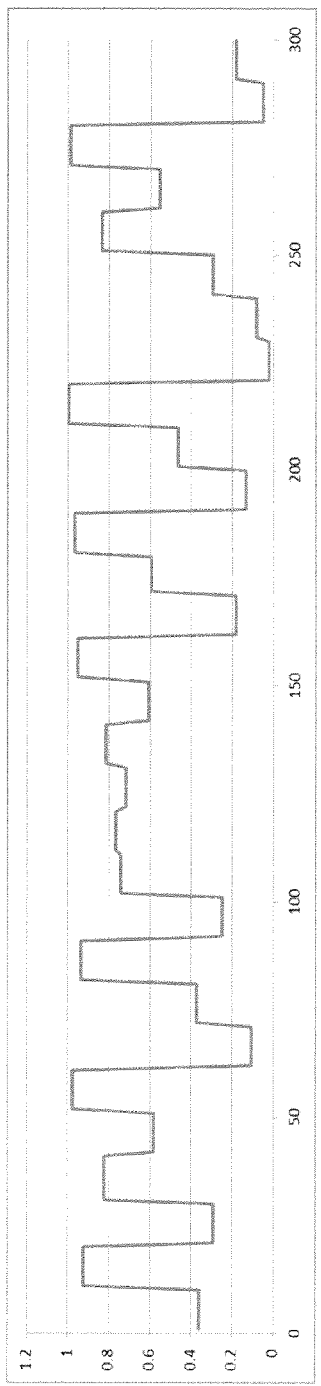

Of course, chaotic function control components can be applied to control various conditions and characteristics in a variety of other ways. As another example, consider next FIGS. 6A to 6C and 7. FIG. 6A is another illustration of the chaotic function in the unstable-with-attractors state, similar to that shown in FIG. 4A. FIG. 6B shows another chaotic function in a similar state but using a different timing rate. The drawings show the two chaotic functions over the same period, 0 to 300 time units. However, the function shown in FIG. 6A varies at a higher rate than the lower rate variation of the function shown in FIG. 6B. Although the functions could vary in other ways too, in this example, both are implemented with or defined by the same equation, such as equation (1) above. To achieve the different rate functions, the functions use a different timing cycle or rate for n. For example, the function in FIG. 6A might be controlled using n in values of seconds; whereas the FIG. B implementation of the function might be expressed using n in terms of minutes or hours. Another approach to obtaining two somewhat different chaotic functions, even if using essentially the same formula or equation is to vary the coefficient r. Of course, another exemplary approach would be to use different equations.

Figure 6C:
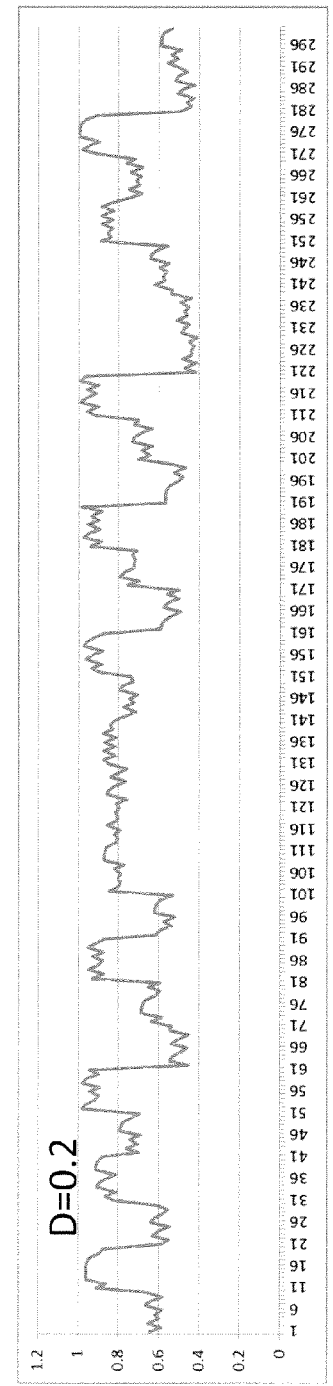

FIG. 6C shows a combination of the two chaotic functions. The chaotic functions may be combined in a variety of ways. In the example, assume that the low frequency chaotic function of FIG. 6B is Cf(Lo) and the high frequency chaotic function of FIG. 6A is Cf(Hi). With that nomenclature, the combined function C of FIG. 6C can be expressed as C=Cf(Lo)×(1−Cf(Hi)×D), where D is a damping coefficient. In the specific illustrated example, D in FIG. 6C is 0.2.

A function like that of FIG. 6C can in turn be used to control a characteristic of visible light, atmospheric condition or sound. For example, the function of FIG. 6C could be added onto, adjusted with a coefficient and multiplied by or otherwise superimposed on the regular setting value for a characteristic of the controlled condition. If so combined with the normal value, such as a set temperature or humidity or the set light intensity or the sound volume level setting, the controlled characteristic would vary above or about the set value in accordance with the function of FIG. 6C. As a result, over the assigned period, the actual characteristic level would be the selected setting value with a variable amount determined by the function of FIG. 4C.

Figure 7:
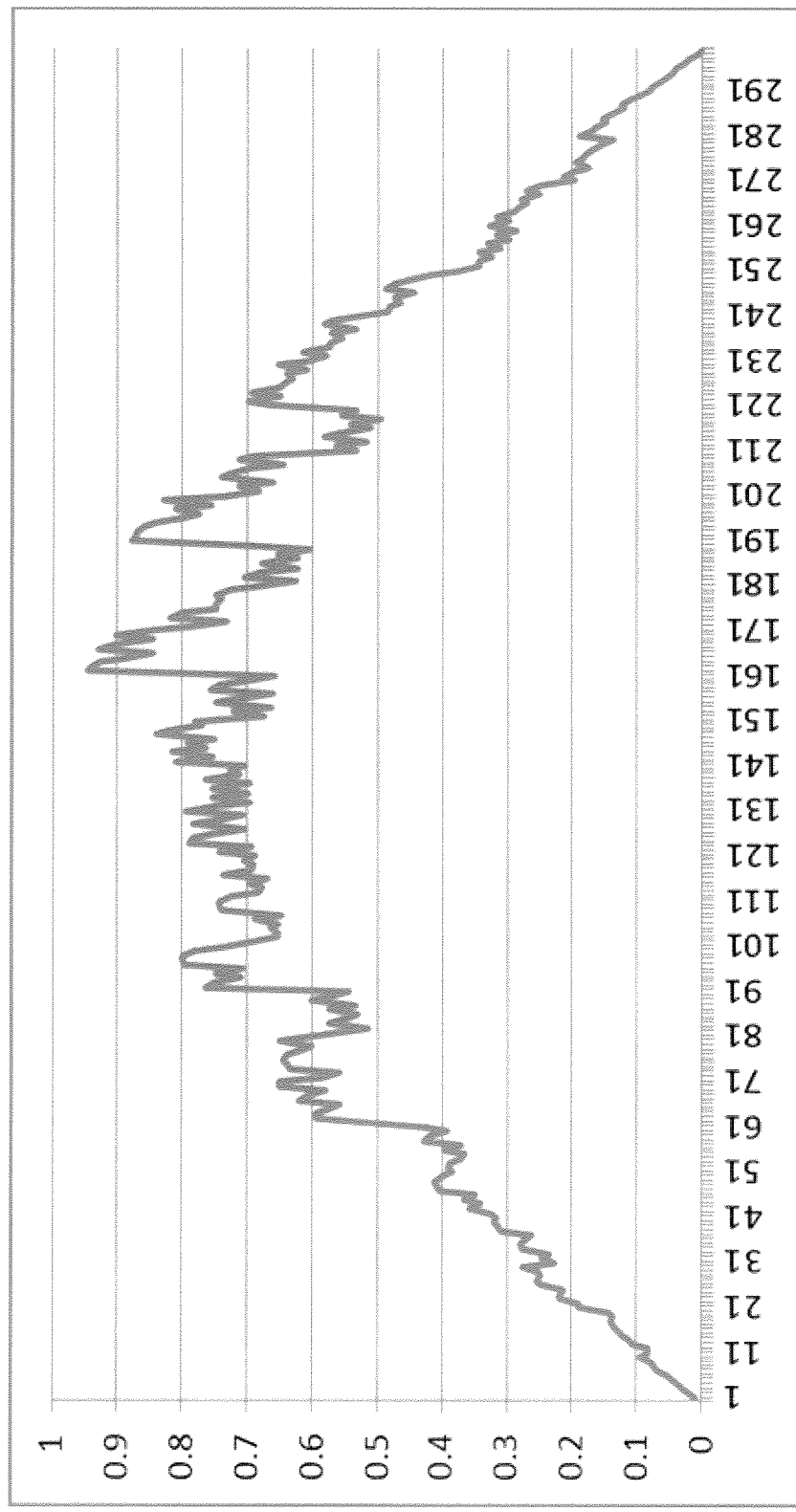
FIG. 7 depicts an example of the two-chaotic example of FIG. 6C combined together with a portion of a sine wave.

As an alternative approach, the two chaotic functions can be combined with a sine wave, to produce a function like that shown in FIG. 7. Again, the sine function is used here as just an easy example of a nominal function that may roughly approximate general trends of variations of naturally occurring environmental characteristics. The combination technique could combine the function of the FIG. 6C with a sine wave like that of FIG. 4B in a manner similar that that used with respect to the function of FIG. 4C. In the actual example of FIG. 7 however, each chaotic function from FIGS. 6A and 6B is separately combined with the sine wave and then the two results are averaged to produce the overall/combined function of FIG. 7.

Again using the nomenclature used in the discussion of FIG. 6C, the low frequency chaotic function Cf(Lo) of FIG. 6B is combined with the sine by multiplying the outcome of the sine equation by one minus Cf(Lo) times a dampening parameter D, to obtain a value v1. Similarly, the high frequency chaotic function Cf(Hi) of FIG. 6A is combined with the sine by multiplying the outcome of the sine equation by one minus Cf(Hi) times a dampening parameter D, to obtain a value v2. The damping parameters could be different; but for simplicity here, the damping parameters are the same value D, such as 0.2. The function of FIG. 7 is then obtained by averaging the two intermediate combinational functions, i.e. using (v1+v2)/2.

The function of FIG. 7 can be used to directly control one or more of the environmental characteristics, or the function of FIG. 7 can be combined with a setting for the characteristic(s) as in the earlier examples. Again, such a control function can be applied to light intensity and/or to one or more other characteristics of light, such as spectral content of light, polarization of light, color temperature of light, and chromaticity difference (Delta_uv) of light from the Planckian locus. Similarly, such a control function can be applied to any or all of the controlled characteristics of the atmospheric condition and/or to any or all of the controlled characteristics of sound in the space 11.

For environmental control applications, particularly for indoor spaces, chaotic functional control will not exactly track natural conditions. In some cases, the resulting variations may be quite different from those that occur in the nature. However, to promote some purposes of the environmental controlled space 11, the variation captures or adds a degree of liveliness similar or analogous to variations in nature. With such arrangements of the control algorithm implemented by controller 49, the chaotic function and/or the combination of a nominal function and the chaotic function for one or more of the controlled characteristics would approximate a natural variation of the relevant characteristic(s) of the environment. Again, using lighting as the example, it may be useful to consider some examples of actual measured lighting conditions.

Figures 8A, 8B, 8C:
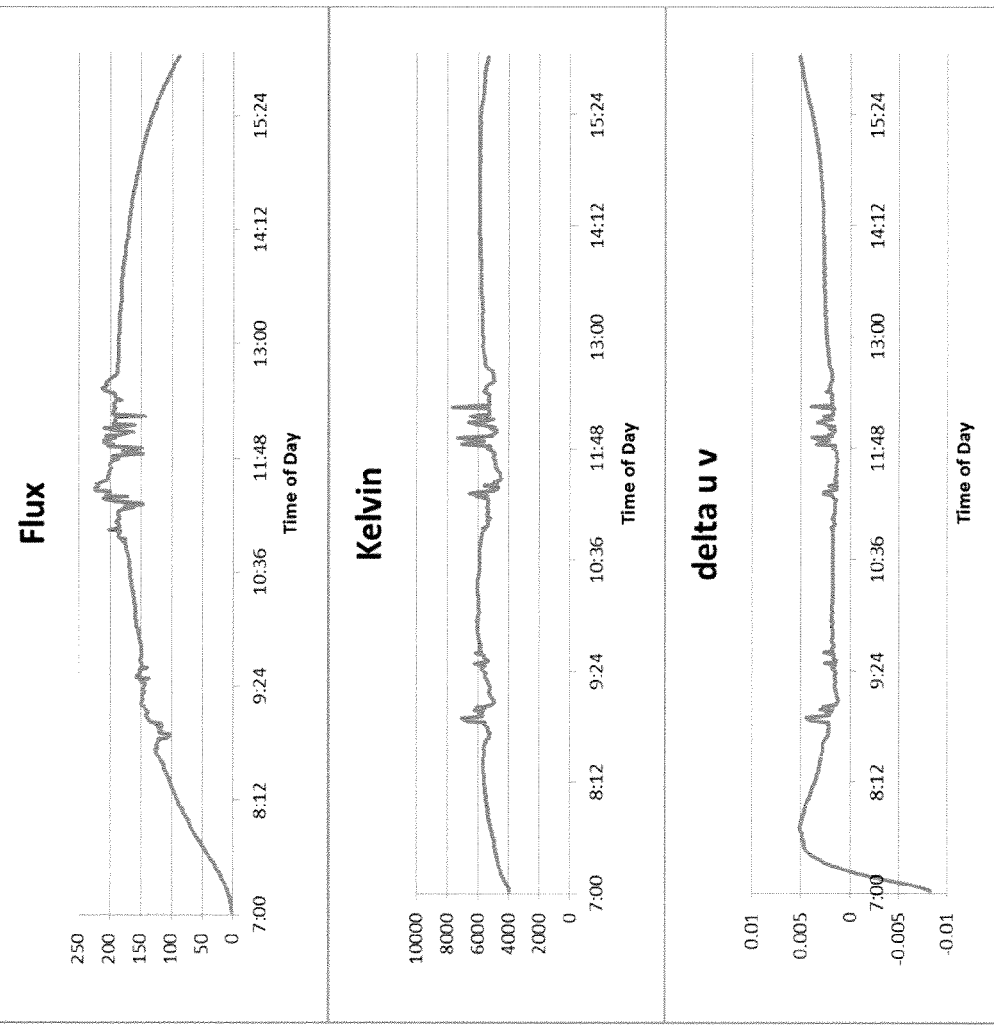
FIGS. 8A to 8C are graphs of light condition measurements, specifically flux, color temperature and chromaticity difference (Delta_uv), for a sunny day.
Figure 9A:
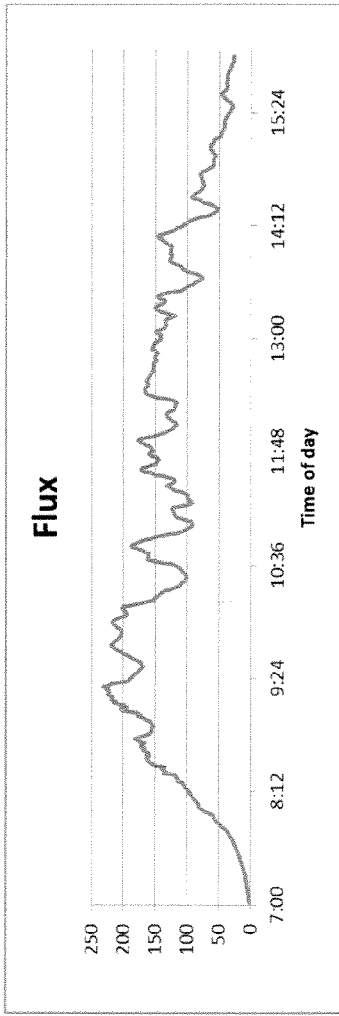
FIGS. 9A to 9C are graphs of light condition measurements, specifically flux, color temperature and chromaticity difference (Delta_uv), for a cloudy day.
Figure 9B:
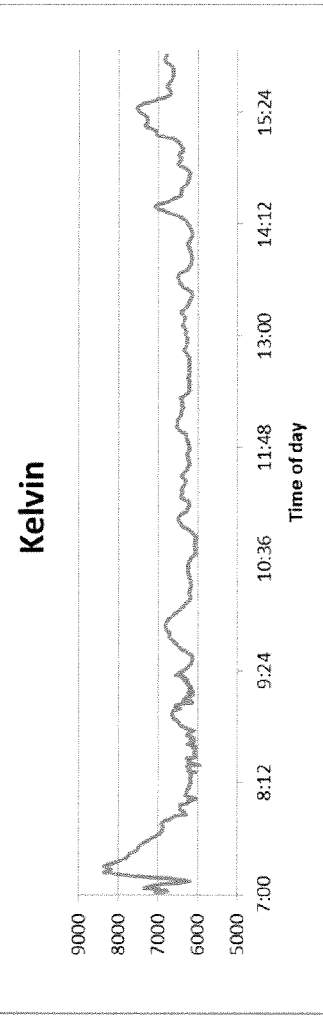
Figure 9C:
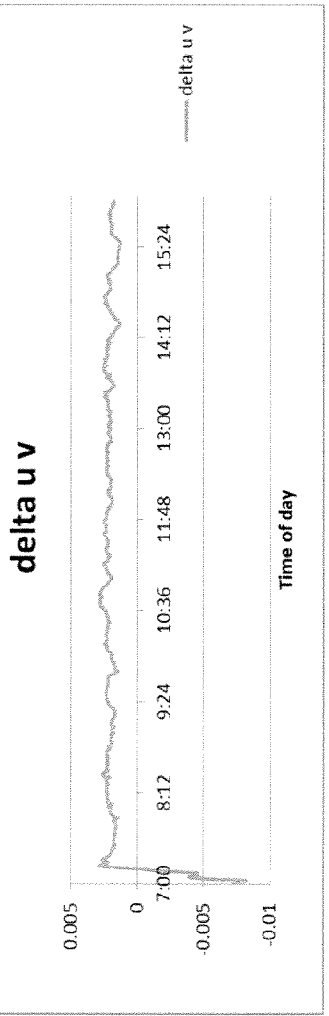

FIGS. 8A to 8C respectively show measured intensity (light flux, for example, measured in foot-candles or fcd) color temperature (in degrees Kelvin (K)) and chromaticity difference (Delta_uv) for a sunny day. FIGS. 9A to 9C show similar measurements taken a somewhat cloudy day.

The readings used to form the graphs in these three sets of drawings were measured using a Minolta luminance meter arranged to collect outside light through a window (aimed not to collect indoor artificial light). However, the window did have some filter effect, e.g. tinting and UV protection. Also, some light reflected in from outside objects. Hence, the measurements represent light entering a room through the window. Photopic flux—represents amount of light—as shown in FIGS. 8A and 9A and is a measure of light intensity. Color temperature (K) and chromaticity difference (Delta_uv) are two commonly used color characteristics of light. The illustrated measurements are intended to show relative readings that vary over time, rather than actual values.

FIGS. 8A to 8C show that flux, color temperature and Delta_uv have highest rates of change at about the same time. The different characteristics of light may be fairly monotonic over one or more substantial periods during the sunny day, but then each exhibits a period of more chaotic changes. Periods of chaotic change roughly correspond. In a control system, the equations for the three factors may be coordinated in time. If the control is intended to achieve a result similar to one or more of these measurement graphs, the control could vary the coefficient r for different times of day, between a value that produces monotonic results and a value that produces an unstable result with attractors. This approach tends to liven up or put life (dynamic change) into the controlled conditions in the space in a manner that an occupant might perceive as similar to a pleasant sunny day outdoors.

An emulation of a cloudy day may not feel as exciting as the emulation of the sunny day, but such a control approach could be useful in some settings or for some purposes. Hence, chaotic control functions could be used to achieve lighting variations in one or more characteristics of light somewhat similar to those shown by way of examples in FIGS. 9A to 9C.

It should be noted, however, that the concepts described here are not particularly intended to copy or mimic exact characteristics of lighting on any particular day, e.g. the sunny day. The strategies here could be used to copy specific daylight characteristics, but typically would not. Instead, the intent of discussing the actual day light measurements is to learn and teach about relevant chaos theory based on the natural day conditions, and then develop our techniques to add analogous components via chaotic function control to dynamic change into the controlled lighting and/or other conditions in the environmentally controlled space.

Where the lighting device or system will varying more than one characteristic of the light, the components added to vary one characteristic may be different and/or relate to parameters of a different type of day. For example, the light flux or intensity might vary in accordance with the function shown in FIG. 6C, whereas one or both of the color characteristics might look more like those from one of the days discussed above relative to FIGS. 8B, 8C, 9B or 9C. Similar principles are applied to control various characteristics of atmospheric condition and/or sound in the space.

In some instances outlined above, the controlled value of a characteristic of an environmental condition would be defined by a setting value plus a variable function that is or includes a chaotic function, such as one of functions discussed above relative to drawings such as FIGS. 4A, 4C, 6A to 6C and 7. However, some or all of the variations may be limited, for example, to insure that the variations do not deviate from setting values in a manner that might reduce serviceability of the lighting in the space 11. Using lighting by way of an example, it may be undesirable for the intensity to fall below a minimum specified by a government regulatory agency or for a color characteristic to vary in a manner that might be disturbing or distracting. As another example, it may not be desirable for temperature to vary too far from a level deemed comfortable. Hence, the controller may be configured to limit extent of the variation in accordance with any of the chaotic functions to less than or equal to a predetermined maximum amount and/or to limit rate of the variation in accordance with any of the chaotic functions to less than or equal to a predetermined maximum rate.

In an environmental control device or system that utilizes a programmable device in the controller, such as a microprocessor or a micro-control unit (MCU) as the CPU, the relevant control functionality is defined by the executable instructions that program the CPU of the programmable environmental control device or system. The chaotic function control can be programmed into such a device or system as part of the initial manufacture or installation. Alternatively, the chaotic function control may be retrofitted into an existing device or system, for example, by updating the control program for the relevant controller(s). Generally, the discussion above has focused on techniques and equipment for implementing the chaotic function control of one or more environmental conditions. However, where a programmable controller is used, the chaotic function control may also be embodied in the control program for the environmental control device or system.

In this regard, a program product or 'article of manufacture' may take the form of a machine or computer readable medium in combination with the relevant program instructions embodied in the medium. Non-transitory forms of such a medium, for example, include various types of memories that may be used in the controllers to store programs for use by the CPUs as well as various types of disk storage media that might be used to hold the programming before downloading through a network for installation in a particular controller.

The concepts outlined above are susceptible to a wide range of variation within the general range of the exemplary teachings herein.

As noted earlier, the technologies discussed in the examples may be applied to environmental control for spaces intended for other biological occupants in addition to or instead of humans. Examples of application with respect to other biological life forms include applications for plants and animals, aquatic life forms, insects, etc. The environmental control may help to increase growth and yield.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," "includes," "including," or any other variation thereof, are intended to cover a non-exclusive inclusion, such that a process, method, article, or device that comprises a list of elements does not include only those elements but may include other elements not expressly listed or inherent to such process, method, article, or device. An element proceeded by "a" or "an" does not, without further constraints, preclude the existence of additional identical elements in the process, method, article, or device that comprises the element.

Unless otherwise stated, any and all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

What is claimed is:

1. A method of environmental control, comprising steps of:
automatically producing a chaotic variation of a controlled characteristic of a first environmental condition in a space to be utilized by one or more occupants, during a period of time less than a day, at least in part in accordance with a first chaotic function that produces one of quad-stable results or unstable results with attractors in the chaotically varied controlled characteristic of the first environmental condition; and
automatically producing a chaotic variation of a controlled characteristic of a second environmental condition in the space, different from the first environmental condition, during a period of time less than a day when the space is occupied, at least in part in accordance with a second chaotic function that produces one of quad-stable results or unstable results with attractors in the chaotically varied controlled characteristic of the second environmental condition, wherein:
the first environmental condition is artificial visible illumination within the space; and
the second environmental condition is not directly related to visible illumination within the space.

2. The method of claim 1, wherein the first chaotic function is different from the second chaotic function.

3. The method of claim 1, further comprising:
sensing a characteristic of ambient light in the space,
wherein the step of automatically varying the characteristic of the first environmental condition comprises controlling of the variation of the characteristic of the visible illumination at least partially in response to the sensed characteristic of ambient light in the space.

4. The method of claim 1, wherein the second environmental condition is sound.

5. The method of claim 1, wherein the second environmental condition is atmospheric condition in the space.

6. The method of claim 5, wherein the controlled characteristic of the first environmental condition is a characteristic of visible light in the space selected from the group consisting of: intensity of light, spectral content of light, polarization of light, color temperature of light, and chromaticity difference (Delta_uv) of light from the Planckian locus.

7. The method of claim 6, wherein the controlled characteristic of the second environmental condition is a characteristic of the atmospheric condition in the space selected from the group consisting of: temperature, humidity, pressure, ionization, air movement, visibility and chemical composition.

8. The method of claim 1, wherein the step of varying the controlled characteristic of the first environmental condition comprises varying the characteristic of the first environmental condition in accordance with a combination of a first nominal function over the period of time and the first chaotic function.

9. The method of claim 8, wherein the combination of the first nominal function and the first chaotic function approximates a natural variation of the controlled characteristic of the first environmental condition.

10. The method of claim 1, wherein at least one of the automatically producing steps comprises limiting variation to less than or equal to a maximum extent of variation.

11. The method of claim 1, wherein at least one of the automatically producing steps comprises limiting variation to less than or equal to a maximum rate of variation.

12. The method of claim 1, further comprising:
sensing a characteristic of ambient relative to one of the controlled characteristics in the space,
wherein at least one of the steps of automatically producing controlled variation is at least partially responsive to the sensed ambient characteristic.

13. An article of manufacture, comprising a non-transitory machine readable medium and instructions embodied in the medium for configuring a programmable controller of an environmental control system to implement the method of claim 1.

14. The method of claim 1, wherein each chaotic function comprises a mathematical expression that determines the variation of the respective controlled characteristic in a dynamic manner that appears random or lacking in order.

15. The method of claim 14, wherein each mathematical expression is dynamic and highly sensitive to an initial condition.

16. The method of claim 1, wherein:
the first chaotic function comprises a first mathematical expression;
the second chaotic function comprises a second mathematical expression; and
the first mathematical expression is the same as the second mathematical expression.

17. A method of environmental control, comprising steps of:
automatically producing a chaotic variation of a controlled characteristic of a first environmental condition in a space to be utilized by one or more occupants, during a period of time less than a day, at least in part in accordance with a first chaotic function; and
automatically producing a chaotic variation of a controlled characteristic of a second environmental condition in the space, different from the first environmental condition, over a period of time less than a day, at least in part in accordance with a second chaotic function, wherein:
the step of chaotically varying the controlled characteristic of the first environmental condition comprises varying the controlled characteristic of the first environmental condition in accordance with a combination of a first nominal function and the first chaotic function;
the step of chaotically varying the controlled characteristic of the second environmental condition comprises varying the controlled characteristic of the second environmental condition in accordance with a combination of a second nominal function and the second chaotic function;
when the space is occupied, variations of the controlled characteristics of the environmental conditions impact perception of the space by a human occupant of the space; and the second nominal function is different from the first nominal function.

18. The method of claim 17, wherein the combination of the second nominal function and the second chaotic function approximates a natural variation of the controlled characteristic of the second environmental condition.

19. An environmental control system, comprising:
a first environmental conditioner configured to control of a characteristic of a first environmental condition in a space to be utilized by one or more occupants, so as to automatically chaotically vary the controlled characteristic of the first environmental condition during a period of time less than a day, at least in part in accordance with a first chaotic function that produces one of quad-stable results or unstable results with attractors in the chaotically varied controlled characteristic of the first environmental condition, the first environmental conditioner comprising a controlled lighting device for illuminating the space; and
a second environmental conditioner configured to control of a characteristic of a second environmental condition in the space different from the first environmental condition, so as to automatically chaotically vary the controlled characteristic of the second environmental condition during a period of time less than a day when the space is occupied, at least in part in accordance with a second chaotic function that produces one of quad-stable results or unstable results with attractors in the chaotically varied controlled characteristic of the second environmental condition.

20. The system of claim 19, wherein the second environmental conditioner comprises a device configured to control an abiotic characteristic of atmospheric condition in the space.

21. The system of claim 20, wherein:
the lighting device is configured to control one or more light characteristics selected from the group consisting of: intensity of light, spectral content of light, polarization of light, color temperature of light, and chromaticity difference (Delta_uv) of light from the Planckian locus, so as to vary at least in part in accordance with the first chaotic function; and
the second environmental conditioner is configured to control one or more abiotic atmospheric characteristics selected from the group consisting of: temperature, humidity, pressure, ionization, air movement, visibility and chemical composition, so as to vary at least in part in accordance with the second chaotic function.

22. The system of claim 19, wherein each chaotic function comprises a mathematical expression that determines the variation of the respective controlled characteristic in a dynamic manner that appears random or lacking in order.

23. The system of claim 22, wherein each mathematical expression is dynamic and highly sensitive to an initial condition.

24. An environmental control system, comprising:
a source of visible artificial light configured to illuminate a space to be utilized by one or more occupants;
a conditioner configured to establish another environmental condition within the space not directly related to illumination of the space;
a controller coupled to control operation of the source of visible artificial light and the at least one conditioner, wherein the controller is configured to:
control operation of the source of visible artificial light so as to automatically produce chaotic variation of a controlled characteristic of visible artificial light emitted from the source into the space during a period of time less than a day, at least in part in accordance with a first function including a first chaotic function component that produces one of quad-stable results or unstable results with attractors in the chaotically varied controlled characteristic of the visible artificial light, and
control operation of the conditioner so as to automatically produce chaotic variation of a controlled characteristic of the other environmental condition within the space during a period of time less than a day when the space is occupied, at least in part in accordance with a second function including a second chaotic function component that produces one of quad-stable results or unstable results with attractors in the chaotically varied controlled characteristic of the other environmental condition,
wherein the second function is different from the first function.

25. The system of claim 24, wherein the conditioner is a device configured to establish an abiotic characteristic of atmospheric condition in the space selected from the group consisting of: temperature, humidity, pressure, ionization, air movement, visibility and chemical composition.

26. The system of claim 25, wherein the second chaotic function component of the second function comprises a mathematical expression that determines the variation of the controlled characteristic of the abiotic environmental condition within the space in a dynamic manner that appears random or lacking in order.

27. The system of claim 26, wherein the mathematical expression is dynamic and highly sensitive to an initial condition.

28. The system of claim 24, wherein the conditioner comprises a heating and air conditioning system, a humidity generator, an ion generator, an air flow generator or an air pressure generator.

29. The system of claim 24, wherein the controller is further configured to control operation of the conditioner such that the variation of the controlled characteristic of the other environmental condition comprises varying the controlled characteristic of the other environmental condition in accordance with a combination of a nominal function and the second chaotic function.

30. The system of claim 29, wherein the combination of the nominal function and the second chaotic function approximates a natural variation of the at least one controlled characteristic of the other environmental condition.

31. The system of claim 24, wherein the controller is further configured to control operation of the conditioner such that the variation of the controlled characteristic of the other environmental condition effects perception by the one or more occupants in a manner that promotes an objective purpose of the space when occupied.

32. The system of claim 24, wherein:
the first chaotic function component of the first function comprises a mathematical expression that determines the variation of the controlled characteristic of the visible light emitted from the source into the space in a dynamic manner that appears random or lacking in order; and
the second chaotic function component of the second function comprises a mathematical expression that determines the variation of the controlled characteristic of other environmental condition in a dynamic manner that appears random or lacking in order.

33. The system of claim 32, wherein each mathematical expression is dynamic and highly sensitive to an initial condition.

34. An environmental control system, comprising:
a first environmental conditioner configured to control of a characteristic of a first environmental condition in a space to be utilized by one or more occupants, so as to chaotically vary the controlled characteristic of the first environmental condition over a period of time less than a day, at least in part in accordance with a first chaotic function; and
a second environmental conditioner configured to control of a characteristic of a second environmental condition in the space different from the first environmental condition, so as to chaotically vary the controlled characteristic of the second environmental condition over a period of time less than a day, at least in part in accordance with a second chaotic function, wherein:
the first environmental conditioner is further configured to enable control such that the chaotic variation of the controlled characteristic of the first environmental condition comprises varying the controlled characteristic of the first environmental condition in accordance with a combination of a first nominal function and the first chaotic function;
the second environmental condition is further configured to enable control such that the chaotic variation of the controlled characteristic of the second environmental condition comprises varying the controlled characteristic of the second environmental condition in accordance with a combination of a second nominal function and the second chaotic function;
when the space is occupied, variations of the controlled characteristics of the environmental conditions impact perception of the space by a human occupant of the space; and
the second nominal function is different from the first nominal function.

35. The system of claim 34, wherein:
the first environmental conditioner comprises a controlled lighting device for illuminating the space; and
the second environmental conditioner comprises a device configured to control an abiotic characteristic of atmospheric condition in the space.

36. The system of claim 35, wherein:
the first chaotic function comprises a mathematical expression that determines the variation of the controlled characteristic of visible illumination within the space in a dynamic manner that appears random or lacking in order; and
the second chaotic function comprises a mathematical expression that determines the variation of the controlled characteristic of the second environmental condition within the space in a dynamic manner that appears random or lacking in order.

37. The system of claim 36, wherein each mathematical expression is dynamic and highly sensitive to an initial condition.

38. The system of claim 35, wherein:
the lighting device is configured to control one or more light characteristics selected from the group consisting of: intensity of light, spectral content of light, polarization of light, color temperature of light, and chromaticity difference (Delta_uv) of light from the Planckian locus, so as to vary at least in part in accordance with the first chaotic function; and
the second environmental conditioner is configured to control one or more abiotic atmospheric characteristics selected from the group consisting of: temperature, humidity, pressure, ionization, air movement, visibility and chemical composition, so as to vary at least in part in accordance with the second chaotic function.

* * * * *